USO10017249B1

(12) United States Patent
Tseng et al.

(10) Patent No.: US 10,017,249 B1
(45) Date of Patent: Jul. 10, 2018

(54) DUCTED ROTOR UNMANNED AERIAL VEHICLES

(71) Applicant: Aevena, Inc., San Bruno, CA (US)

(72) Inventors: Jeffrey Tseng, San Bruno, CA (US); Bryan Edwards, Southlake, TX (US)

(73) Assignee: Aevena, Inc., San Bruno, CA (US)

( * ) Notice: Subject to any disclaimer, the term of this patent is extended or adjusted under 35 U.S.C. 154(b) by 0 days.

(21) Appl. No.: 15/243,887

(22) Filed: Aug. 22, 2016

Related U.S. Application Data

(60) Provisional application No. 62/208,408, filed on Aug. 21, 2015.

(51) Int. Cl.
*G05D 1/00* (2006.01)
*B64C 39/02* (2006.01)
*B64D 47/08* (2006.01)
*B64C 27/20* (2006.01)

(52) U.S. Cl.
CPC ............ *B64C 39/024* (2013.01); *B64C 27/20* (2013.01); *B64D 47/08* (2013.01); *B64C 2201/108* (2013.01); *B64C 2201/127* (2013.01); *B64C 2201/141* (2013.01); *B64C 2201/162* (2013.01)

(58) Field of Classification Search
USPC ........................................................... 701/3
See application file for complete search history.

(56) References Cited

U.S. PATENT DOCUMENTS 8,712,679 B1 * 4/2014 Mostofi .................. G09B 29/00
340/552
9,373,149 B2 * 6/2016 Abhyanker ............ G06Q 50/28
(Continued)

FOREIGN PATENT DOCUMENTS

WO   2014160526 A2   10/2014

OTHER PUBLICATIONS

Byers et al., "Say Cheese! Experiences with a Robot Photographer", AI Magazine, vol. 25, No. 3, Sep. 1, 2004, pp. 37-46.
(Continued)

*Primary Examiner* — Tyler Paige
(74) *Attorney, Agent, or Firm* — KPPB LLP

(57) ABSTRACT

Systems and methods in accordance with various embodiments of the invention can be utilized to implement unmanned aerial vehicles ("UAVs") designed for autonomous operation in cluttered environments, indoor environments and/or as photography drones. One embodiment includes: launching an unmanned aerial vehicle (UAV); performing in flight path planning to scan an area for people using the UAV; detecting the presence of at least one subject by processing image data captured by at least one camera on the UAV; determining at least one pose from which to capture images of detected at least one subject using the UAV; performing path planning to navigate the UAV to the determined at least one pose; and capturing images of the detected at least one subject using at least one camera on the UAV when the UAV is posed in one of the determined at least one pose.

16 Claims, 19 Drawing Sheets

(56) References Cited

U.S. PATENT DOCUMENTS

| | | | | |
|---|---|---|---|---|
| 2008/0059065 | A1* | 3/2008 | Strelow | G01C 21/005 701/448 |
| 2010/0147993 | A1* | 6/2010 | Annati | B64C 27/20 244/12.2 |
| 2014/0032034 | A1* | 1/2014 | Raptopoulos | G08G 5/0069 701/25 |
| 2014/0103158 | A1* | 4/2014 | Berry | B64C 29/0025 244/2 |
| 2014/0136414 | A1* | 5/2014 | Abhyanker | G06Q 50/28 705/44 |
| 2015/0192928 | A1* | 7/2015 | Sastre I Sastre | G01C 11/02 701/25 |
| 2015/0260526 | A1* | 9/2015 | Paduano | G01C 21/20 701/461 |
| 2016/0012393 | A1* | 1/2016 | Wang | G06Q 10/08355 705/338 |
| 2016/0068264 | A1* | 3/2016 | Ganesh | G08G 5/0069 701/2 |

OTHER PUBLICATIONS

Crouse, Megan, "VTOL Concept Can Be a Helicopter, Jetpack, or Drone", Product Design and Development, Jun. 29, 2016, retrieved from https://www.pddnet.com/news/2016/06/vtol-concept-can-be-helicopter-jetpack-or-drone on Jun. 28, 2017, 3 pages.

Guizzo, Erico, "Cynthia Breazeal Unveils Jibo, a Social Robot for the Home", IEEE Spectrum, Jul. 16, 2014, retrieved from http://spectrum.ieee.org/automaton/robotics/home-robots/cynthia-breazeal-unveils-jibo-a-social-robot-for-the-home on Aug. 16, 2015, 8 pages.

Marte et al., "A Review of Aerodynamic Noise From Propellers, Rotors, and Lift Fans", National Aeronautics and Space Administration, Jet Propulsion Laboratory—California Institute of Technology, Technical Report 32-1462, Jan. 1, 1970, 58 pages.

Martin et al., "Performance and Flowfield Measurements on a 10-inch Ducted Rotor VTOL UAV", NASA Ames Research Center, Document 20050009943, Jan. 1, 2004, pp. 88-107.

Paulos et al., "An Underactuated Propeller for Attitude Control in Micro Air Vehicles", 2013 IEEE/RSJ International Conference on Intelligent Robots and Systems (IROS), Nov. 3-7, 2013, Tokyo, Japan, pp. 1374-1379.

Pereira, Jason L., "Hover and Wind-Tunnel Testing of Shrouded Rotors for Improved Micro Air Vehicle Design", Dissertation of Jason L. Pereira, University of Maryland, College Park, Aug. 29, 2008, 349 pages.

Pierce, David, "Throw This Camera Drone in the Air and It Flies Itself", Wired, May 12, 2015, retrieved from https://www.wired.com/2015/05/lily-robotics-drone/ on Jun. 28, 2017, 5 pages.

\* cited by examiner

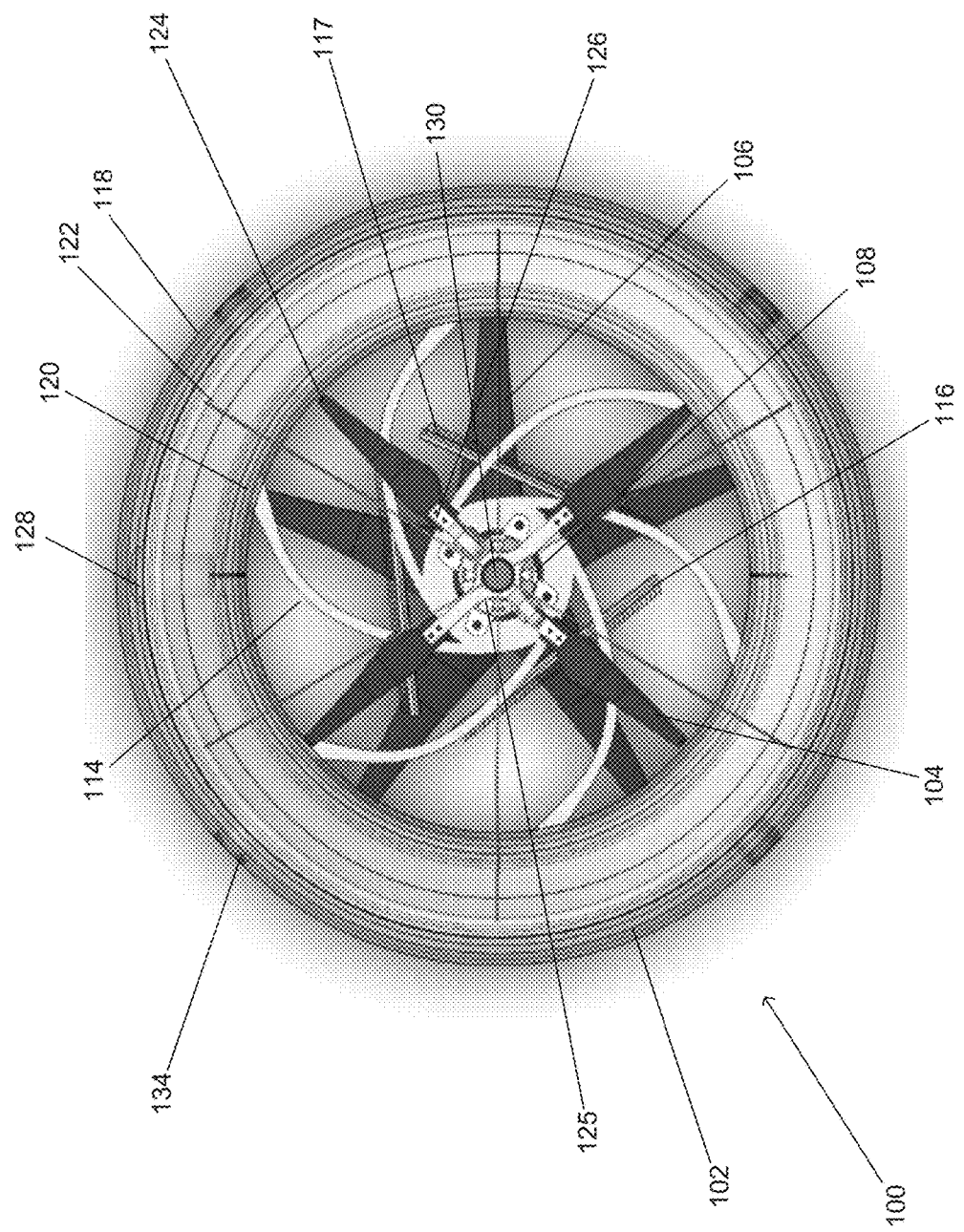

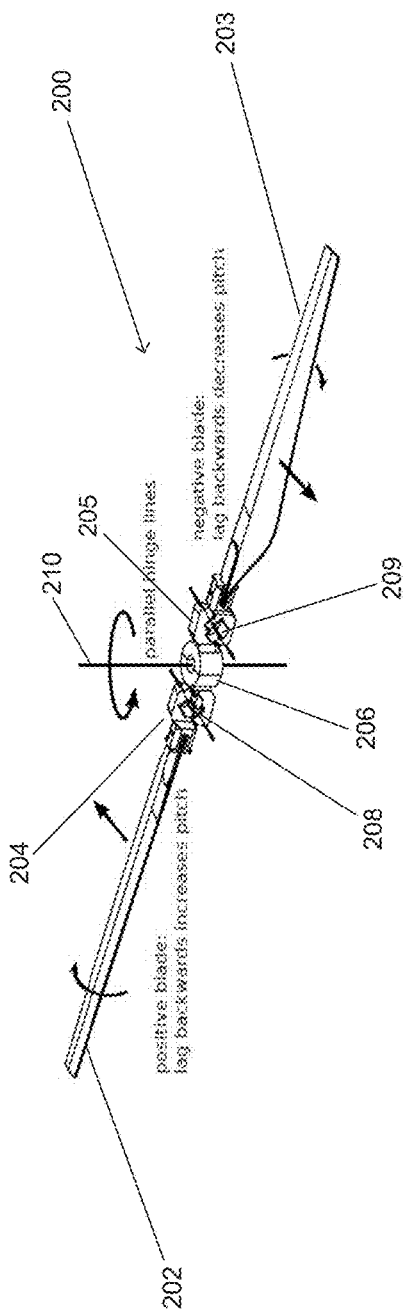
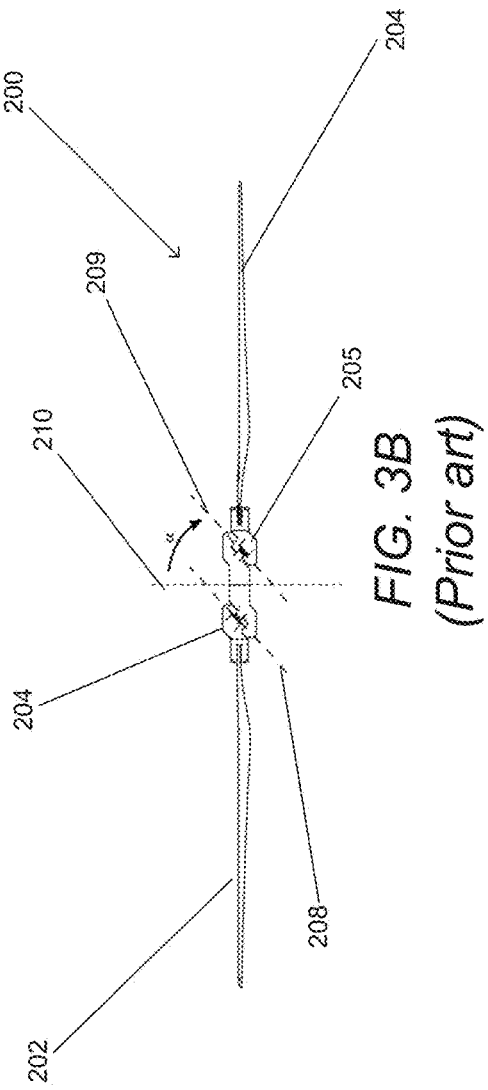
FIG. 3A (Prior art)
FIG. 3B (Prior art)

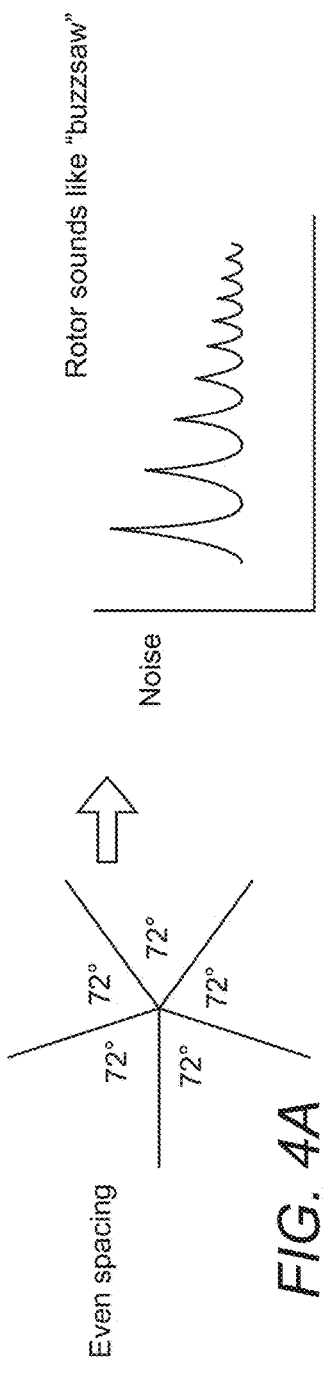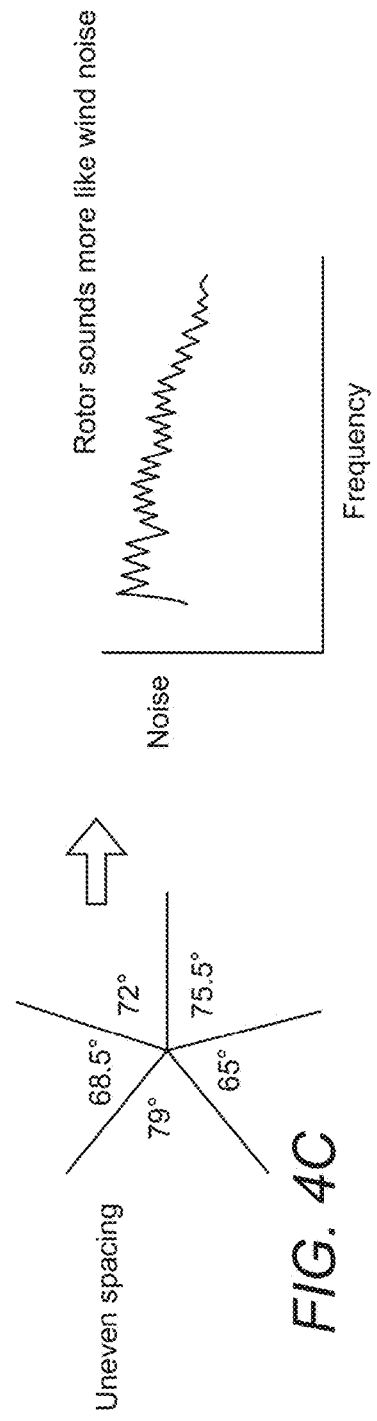

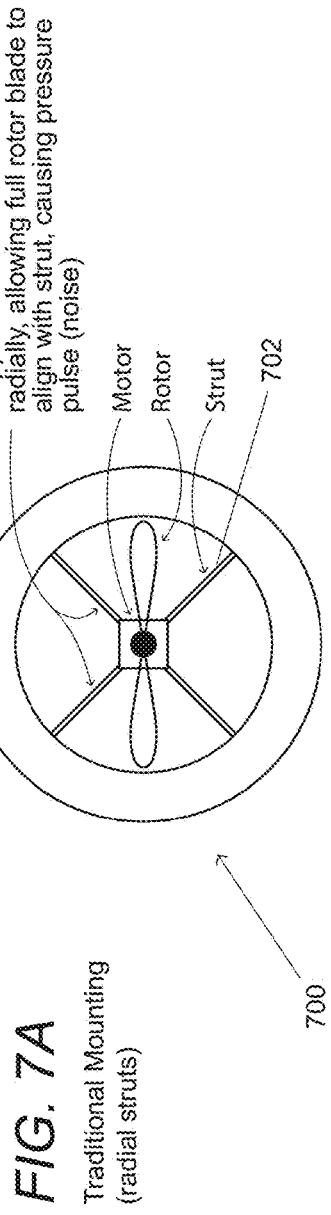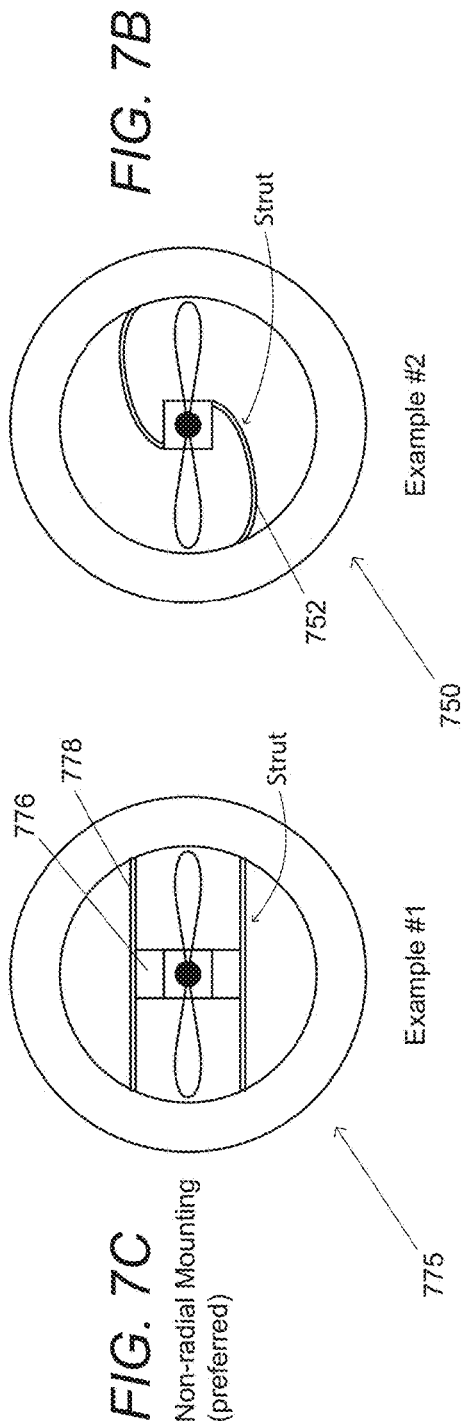

Serrated trailing edge

Serrated leading edge

Wide chord (slight taper)

Scimitar blade (swept back along span)

Spanwise reverse sweep

DUCTED ROTOR UNMANNED AERIAL VEHICLES

CROSS-REFERENCE TO RELATED APPLICATIONS

The current application claims priority under 35 U.S.C. § 119(e) to U.S. Provisional Patent Application Ser. No. 62/208,408 entitled "Ducted Rotor Unmanned Aerial Vehicles" to Tseng et al., filed Aug. 21, 2015. The disclosure of U.S. Provisional Patent Application Ser. No. 62/208,408 is hereby incorporated by reference in its entirety.

FIELD OF THE INVENTION

The present invention relates to unmanned aerial vehicles and more specifically to unmanned aerial vehicles configured to operate in cluttered environments.

BACKGROUND

Unmanned or uninhabited aerial vehicles ("UAVs"), commonly referred to as drones, are aircraft without a human pilot aboard. UAVs may be remotely piloted and/or can navigate autonomously. A variety of propulsion technologies are currently utilized. UAVs that are in use today vary in size from Micro Air Vehicles ("MAVs") having no dimension larger than 15 cm to UAVs with wingspans of several tens of feet. Depending upon the application, UAVs can carry cameras, sensors, communications equipment, and/or other payloads.

For operation in highly-congested, highly cluttered environments like urbanized areas, whether indoors or outdoors, UAVs are typically required to be able to have high maneuverability at low speeds, and the capability of hovering. UAVs that have these capabilities are typically regarded to fall within three classes: rotating-wing configurations, like helicopters and tilt-rotors, flapping-wing configurations (emulating birds or insects), and fixed wing configurations with powered-lift capability. For any aircraft, low-speed flight and hovering flight are inherently power-hungry and rotary-wing aircraft tend to exhibit the highest efficiency in hover and low-speed flight relative to other propulsion systems.

The design of a propulsion system for a smaller UAV can be significantly different from the design of a propulsion system for a larger piloted aircraft. Large aircraft, such as commercial airliners and helicopters, operate at Reynolds numbers in the tens of millions, whereas smaller UAVs such as MAVs can operate in a Reynolds number regime of approximately 10,000 to 50,000. The primary implication of operation at comparatively lower Reynolds numbers is a reduction in the maximum lift capacity of an airfoil and increases in pressure drag and skin friction drag when the flow remains attached to the airfoil. Together, these effects can result in extremely low lift-to-drag ratios for airfoils in low Reynolds number flows. The degraded performance of airfoils is an obstacle faced by both fixed and rotary wing MAVs, but is especially critical for the latter, as they spend a large portion of flight in power-intensive hovering and low-speed conditions.

A variety of propulsion systems are currently being utilized in commercial UAVs designed for hovering including coaxial multirotor propulsion systems, radial multirotor propulsion systems, and ducted fans. Coaxial multirotor systems utilize a pair of rotors that are aligned coaxially and configured to rotate in opposite directions. In order to control pitch, yaw, and roll, a coaxial multirotor system typically includes a mechanism that adjusts the pitch of the propeller blades. Usually the pitch change is achieved by mounting servos with mechanical linkages to the propeller blades so that the angle of the propellers can be adjusted. Radial multirotor systems can overcome some of the complexity of coaxial multirotor systems by eliminating the need to tilt the propeller blades to control pitch, yaw, and roll.

Radial multirotor systems are utilized by a class of UAVs that includes quadcopters, hexcopters, and octocopters. Radial multirotor systems typically utilize at least two pairs of fixed pitch propellers. Typically, the pairs of rotors do not all share the same direction of rotation and variations in the angular velocity of the rotors can be utilized to control lift and torque. The principles utilized in the construction of radial multirotor systems can also be utilized to construct UAVs that include coaxial pairs of radial rotors.

UAVs including coaxial and/or radial multirotor propulsion systems often include frames that enclose the rotors to protect the rotors and/or environment during flight. A distinction can be drawn between the use of a frame to protect a propeller and a ducted fan propulsion system. A ducted fan is a propulsion arrangement whereby a mechanical fan, which is a type of propeller, is mounted within a shroud or duct. The duct reduces losses in thrust from the tips of the props, and varying the cross-section of the duct can advantageously affect velocity and pressure of airflow.

SUMMARY OF THE INVENTION

Systems and methods in accordance with various embodiments of the invention can be utilized to implement unmanned aerial vehicles ("UAVs") designed for autonomous operation in cluttered environments, indoor environments and/or as photography drones. An embodiment of the method of the invention includes: launching an unmanned aerial vehicle (UAV) by executing an automatic takeoff process; utilizing a map maintained by the UAV to perform in flight path planning to scan an area for people using the UAV; detecting the presence of at least one subject by processing image data captured by at least one camera on the UAV; determining at least one pose from which to capture images of detected at least one subject using the UAV; performing path planning to navigate the UAV to the determined at least one pose; and capturing images of the detected at least one subject using at least one camera on the UAV when the UAV is posed in one of the determined at least one pose.

A further embodiment also includes capturing audio data using a microphone on the UAV.

Another embodiment includes: at least one rotor incorporating uneven blade spacing mounted within a ducted propulsion system; a flight management unit (FMU) configured to handle all of the computation associated with controlling rotors within the ducted propulsion system; a robotics processing unit (RPU) configured to perform autonomous navigation; and an application processing unit (APU) configured to perform processing associated with high level behavior.

In a still further embodiment, the APU is configured to execute processes including: identification of subjects of interest; pose selection; and image acquisition.

In still another embodiment, each of the FMU, RPU, and APU includes a microprocessor.

While several embodiments are described above, this summary of the invention does not provide a complete summary of all of the novel aspects of the various embodiments of the invention that are described herein. Accordingly, the scope of the invention should be determined based upon the claims appended hereto, and/or any claims that may be added by way of amendment at any point during the prosecution of this application and/or any continuation or continuation-in-part application claiming priority to this application.

BRIEF DESCRIPTION OF THE DRAWINGS

A ducted rotor UAV in accordance with an embodiment of the invention is illustrated in FIGS. 1 and 2A-2G.

FIGS. 3A and 3B, which are reproduced from the Paulos and Yim paper referenced below, conceptually illustrate the manner in which an underactuated rotor can be utilized for attitude control in a UAV.

FIG. 4A illustrates a five airfoil blade.

FIG. 4B conceptually illustrates the power spectrum of sound generated by the evenly spaced rotor illustrated in FIG. 4A.

FIG. 4C illustrates a balanced rotor including five unevenly spaced airfoil blades.

FIG. 4D conceptually illustrates the power spectrum of sound generated by the rotor shown in FIG. 4C.

FIG. 7A illustrates a support structure which aligns with the span of the rotor blade.

FIG. 7B illustrates an UAV including a support structure having spiral arms in accordance with an embodiment of the invention.

FIG. 7C illustrates an UAV including support structures having straight arms that do not extend radially across the duct in accordance with an embodiment of the invention.

A variety of blade shapes that can be shown to be beneficial for reducing noise at low Reynolds numbers are illustrated in FIGS. 8A-8F.

Figures 9A, 9B:
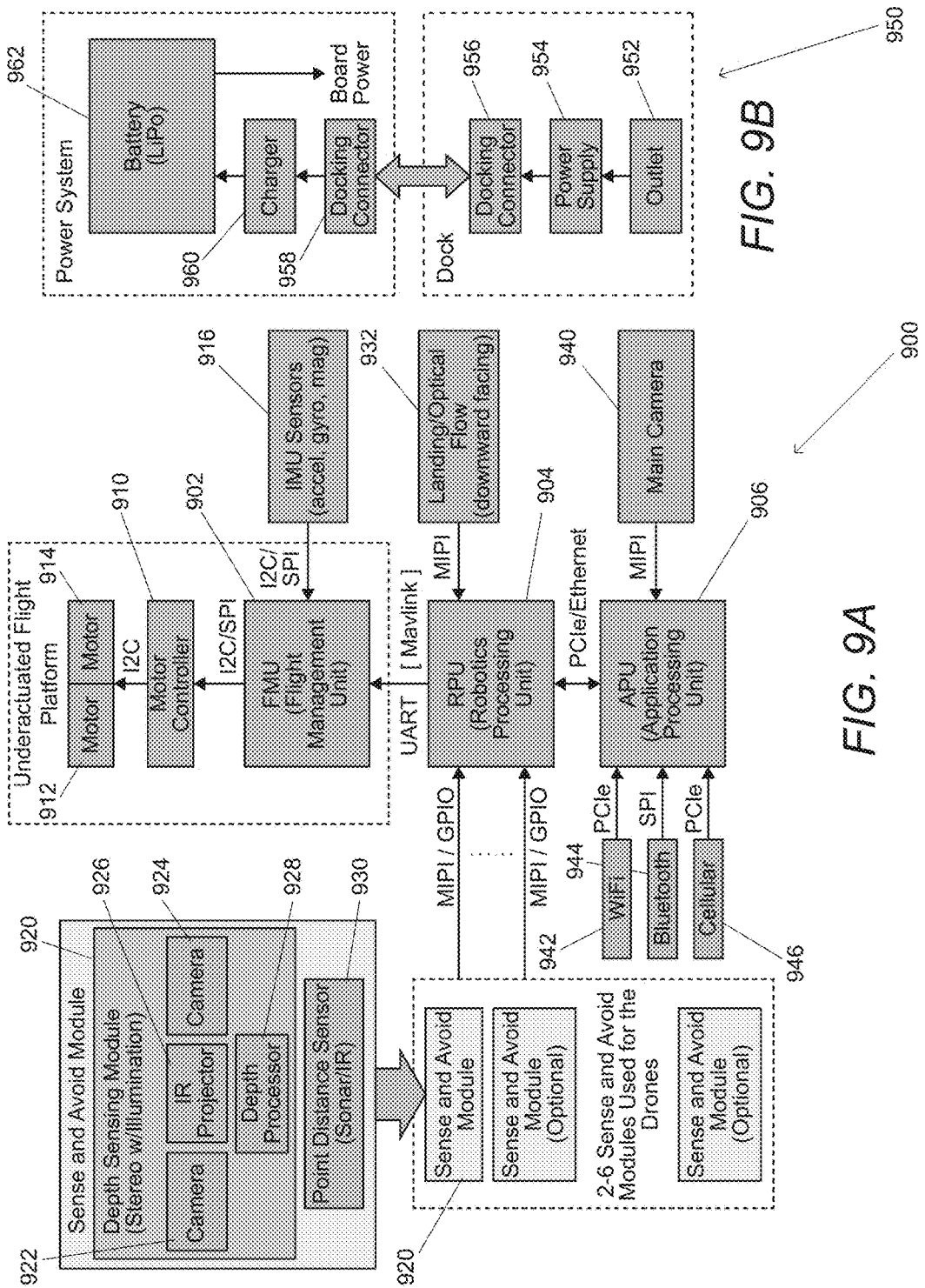

FIG. 9A illustrates electrical components of an UAV in accordance with an embodiment of the invention.

FIG. 9B illustrates a power system of a UAV and its docking station in accordance with an embodiment of the invention.

Figure 10:
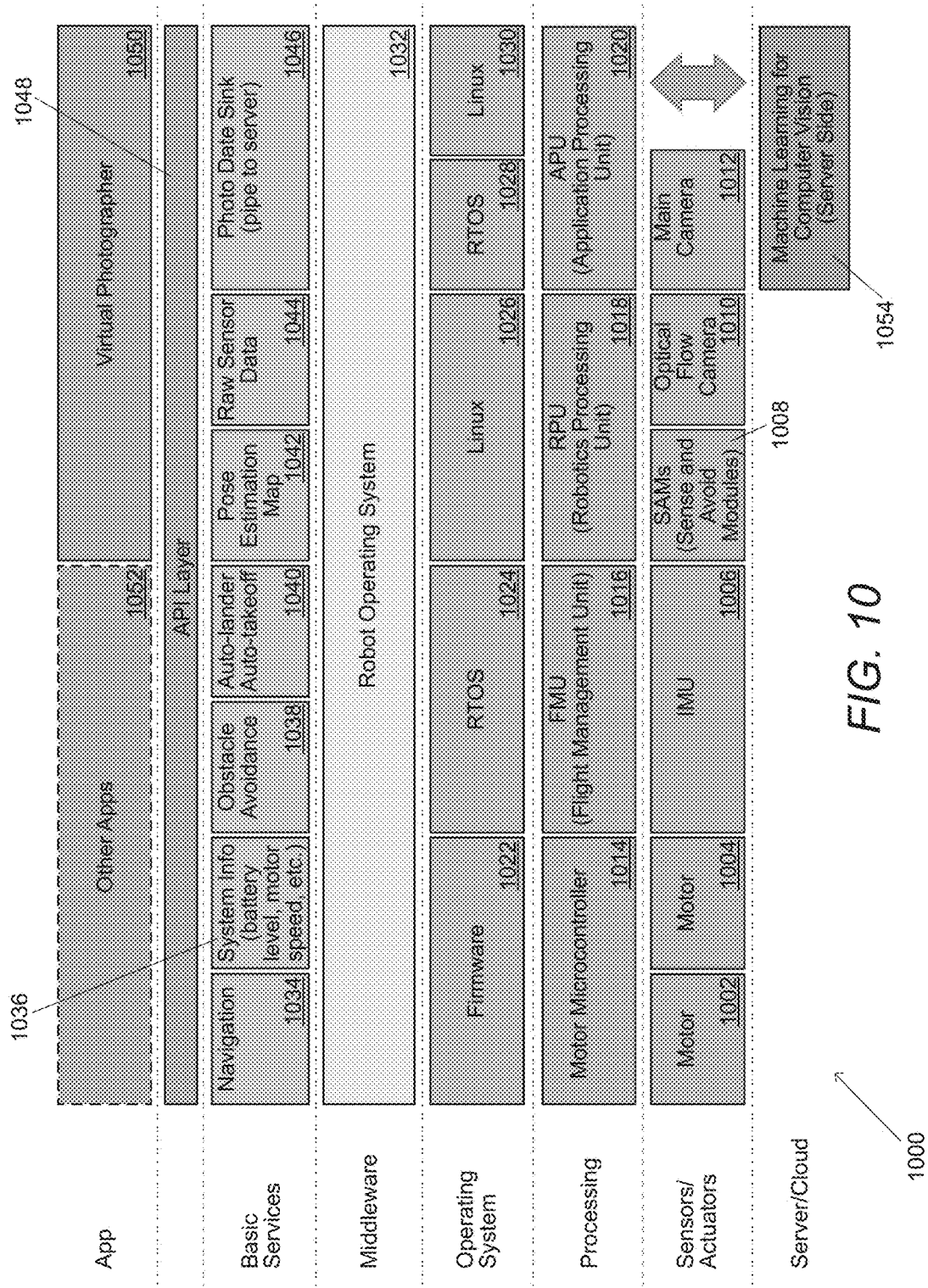

FIG. 10 illustrates a software architecture that can be utilized by an UAV in accordance with an embodiment of the invention.

Figures 11A, 11B:
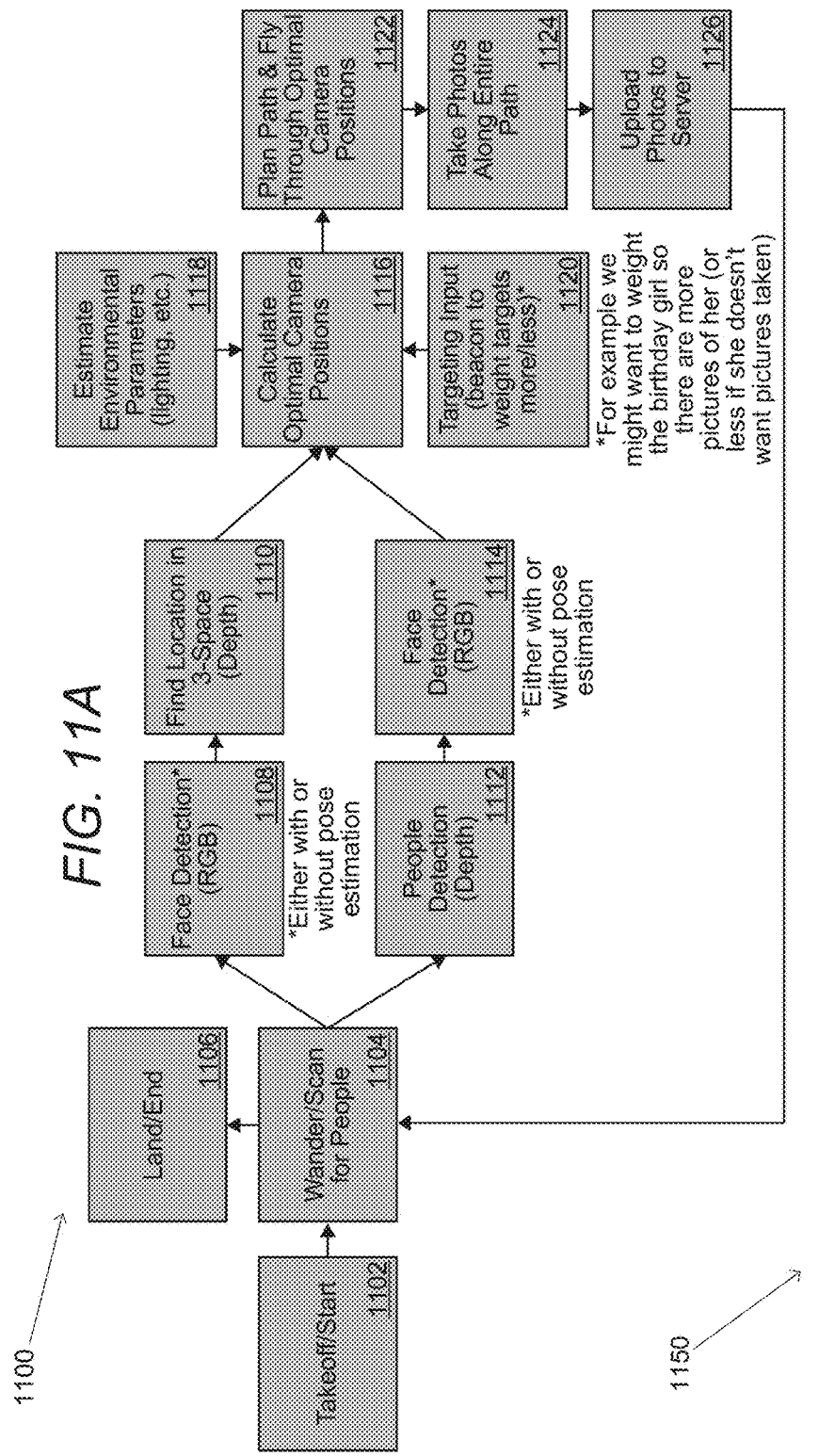

FIG. 11A is a flow chart that conceptually illustrates execution of a virtual photographer application by processors on a UAV in accordance with an embodiment of the invention.

FIG. 11B. illustrates a process for selecting photos captured by a UAV to present via a user interface that can execute on a remote server in accordance with an embodiment of the invention.

Figure 12:
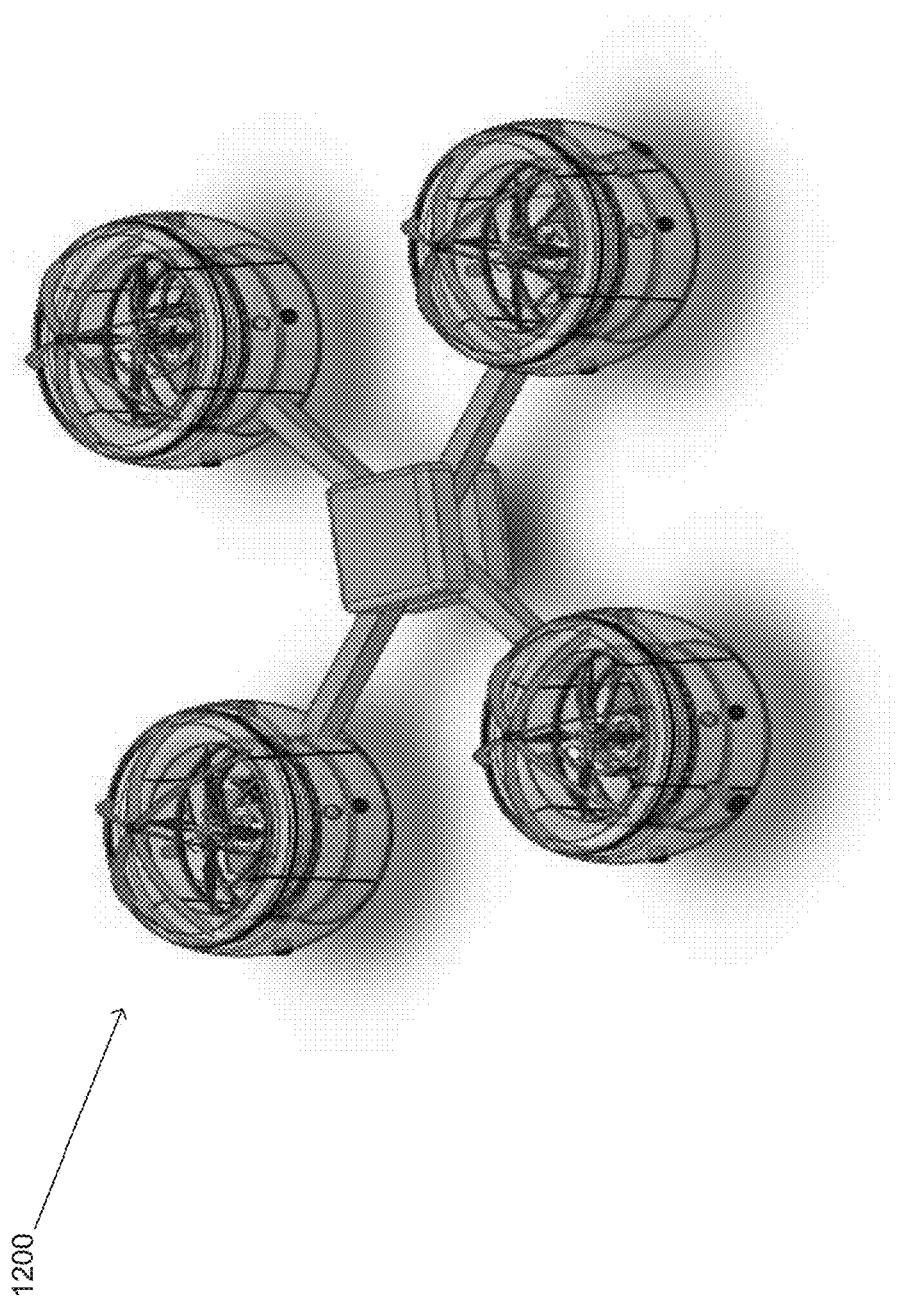

FIG. 12 illustrates a UAV incorporating multiple radial ducted rotor propulsion systems in accordance with an embodiment of the invention.

DETAILED DESCRIPTION

Turning now to the drawings, unmanned aerial vehicles ("UAVs") designed for autonomous operation in cluttered environments in accordance with various embodiments of the invention are illustrated. In several embodiments, the UAV is capable of autonomous navigation and is configured to carry a payload including (but not limited to) a camera for taking photographs of the operating environment of the UAV. In certain embodiments, the UAV is capable of utilizing a machine vision system to identify people within its operating environment. Having located individual people, the UAV can autonomously navigate to a position from which a photograph of the person can be taken using the UAV's camera. In this way, a UAV can autonomously move through a cluttered indoor and/or outdoor environment capturing images of people and/or other objects of interest within the environment. As can readily be appreciated, noise generated by a UAV while capturing images can be distracting to those proximate the drone and/or can introduce additional background noise into audio recordings captured by the UAV. Accordingly, UAVs in accordance with many embodiments of the invention incorporate one or more design elements aimed at reducing the amount of noise generated by the UAV and/or modifying the spectral content of the noise to reduce the extent to which the noise is distracting to people within the vicinity of the UAV. During operation, the UAV can communicate with remote servers and/or local computing devices via a network connection with a wireless gateway device. When not in operation, the UAV can autonomously navigate to a docking station to perform data transfer and obtain power. In several embodiments, the UAV can perch on the docking station and analyze a scene to detect the presence of subjects of interest. When one or more subjects of interest are located, the UAV may take flight to investigate and/or capture images, audio and/or video of the subjects. In many embodiments, the docking station incorporates a computing system and the drone can communicate with the docking station to utilize it as a computing resource.

In several embodiments, the UAVs employ a ducted rotor propulsion system in which one or more rotors are coaxially mounted within a duct. In many embodiments, the ducted rotor propulsion system incorporates at least one underactuated rotor for attitude control. Attitude control is the control of the orientation of the UAV with respect to an internal frame of reference. An underactuated rotor can be utilized to control roll and pitch. Yaw can be controlled by varying the relative speed of the rotors. In certain embodiments, the underactuated rotor includes a rigid hub linked to multiple semi-rigid airfoil blades that are attached to the hub through the use of hinge mechanisms. The use of underactuated rotors to achieve attitude control is described in detail in Patent Cooperation Treaty Application No. PCT/US2014/027841 (published as WO2014160526), the disclosure from which including the disclosure related to the use of underactuated rotors to achieve attitude control is hereby incorporated by reference in its entirety. In several embodiments, the underactuated rotor propulsion system also includes at least one rotor having fixed airfoil blades (i.e. rotors that are not underactuated).

As is discussed in further detail below, many embodiments of the invention utilize underactuated and other hinged rotors to dynamically achieve uneven airfoil blade spacing to more evenly distribute the power spectrum of acoustic pressure waves generated by the rotor. A rotor driven with a constant blade passage frequency typically generates a characteristic "buzzing" sound often likened to the sound of a swarm of bees. The power spectrum of such a rotor is characterized by peaks at harmonic frequencies related to the blade passage frequency of the rotor. By dynamically modifying airfoil blade spacing of an underactuated rotor using an impulsive torque applied to the rotor, the rotor can be driven in a manner that results in a sound that is more similar to white noise/wind blowing (i.e. a more evenly distributed power spectrum). Rotors with fixed airfoil blades can also be constructed to include uneven airfoil blade spacing to achieve a similar power spectrum for the acoustic pressure waves generated by the rotor.

In certain embodiments, various aspects of the duct utilized in the ducted rotor propulsion system are designed to limit the amount of noise generated by the UAV. The use of a duct can serve to reduce direct line of site propagation of acoustic pressure waves from the rotors. In a number of embodiments, the interior surface of the duct is further designed to reduce reflections of acoustic pressure waves within the UAV. In a number of embodiments, the interior wall of the duct is perforated and sound passes through the perforations to a sound absorptive material located on the opposite side of the perforations. In many embodiments, acoustic meshes are positioned across the inlet and/or outlet of the duct to further reduce direct line of site propagation of acoustic pressure waves from the rotors.

In a number of embodiments, the manner in which the rotors are mounted within the ducts is also designed to limit the amount of noise generated by the rotors. The rotors can be mounted on support structures that are designed to avoid edges that align with edges of an airfoil blade at any point during the rotation of the airfoil blade. As discussed below, rotation of an airfoil blade over an edge that aligns with a significant segment of the airfoil blade can compress airflow over the edge generating a pressure wave. In certain embodiments, the UAV includes support structure having spiral arms to support a rotor within the ducted rotor propulsion system, where the leading convex edge of an airfoil blade passes from the convex edge of the spiral to the concave edge to avoid alignment with the edges of the blade and the spiral arm. In other embodiments, any of a variety of support structures having arms that extend in a non-radial manner can be utilized as appropriate to the requirements of specific applications in accordance with embodiments of the invention.

The airfoil blades utilized within the ducted rotor propulsion systems of the UAVs can themselves also be designed to reduce the volume of sound generated by the rotor. In several embodiments, the airfoil blades of the rotor are designed to exhibit elliptical loading along the span of the blade. In many embodiments, the airfoil blades are designed with a scimitar platform. In certain embodiments, serrations are applied to the leading edge of one or more of the airfoil blades. In a number of embodiments, serrations are applied to the trailing edges of one or more of the airfoil blades. Various airfoil blade designs that can be utilized to reduce noise generated by rotors in a UAV are discussed further below.

In several embodiments, the UAV incorporates a variety of sensors that form a sense and avoid module utilized when performing autonomous navigation. In many embodiments, the UAV utilizes a machine vision system to capture image data concerning the operating environment of the UAV. In a number of embodiments, the UAV can supplement image data with data from additional sensors including (but not limited to) accelerometers and/or gyroscopes and/or magnetometers. The data acquired by the sensor systems of the UAV can be utilized to perform simultaneous location and mapping (SLAM). SLAM processes that utilize image data are often referred to as V-SLAM processes. In several embodiments, the V-SLAM system includes a single camera that can have any of a variety of optical systems including (but not limited to) a fisheye lens, or a catadiopitc lens. In certain embodiments, the UAV includes a stereo pair of cameras. In a number of embodiments, the stereo pair of cameras have the same field of view. In other embodiments, the stereo pair of cameras have a 360 degree fields of view. In this way, disparity searches between images captured by the cameras in the stereo pair can be utilized to determine distances to features visible within the fields of view of both cameras. In addition, the stereo pair of cameras can be utilized in a multiview stereo configuration to generate a depth map of the environment surrounding the UAV. A 360 degree field of view can be obtained through the use of cameras with fisheye or catadioptric lenses or by stitching images from multiple cameras together. In a number of embodiments, the accuracy of distance measurements can be increased through the use of projected texture and/or additional cameras. In several embodiments, UAVs can use any of a variety of additional depth sensing technologies including (but not limited to) Light Detection and Ranging (LIDAR) in addition to or as alternative to a multiview stereo depth sensing technology. In many embodiments, the UAVs also include sonar systems to detect the presence of objects. The sonar systems can be particularly useful for collision avoidance in cluttered environments and can provide ranging information within blind spots of depth sensing technologies such as multiview stereo depth sensing systems. Various sensors that can be utilized within sense and avoid modules of UAVs constructed in accordance with embodiments of the invention are discussed further below.

As noted above, UAVs in accordance with many embodiments of the invention carry a primary camera as a payload and utilize the camera to capture images and/or video of the operating environment of the UAV. In several embodiments, the UAV is capable of detecting people and/or faces that are present within its operating environment. In a number of embodiments, the UAV processes depth and/or color (e.g. RGB or Black and White) channels to detect objects of interest such as people and/or faces. Maps generated by V-SLAM processes can be utilized to determine the relative pose of the primary camera and the detected people and/or faces. Based upon the relative pose, the UAV can autonomously navigate into a position where the primary camera is ideally posed for capturing an image and/or video of the one or more people present within the scene captured by the primary camera. In several embodiments, the relative pose selected by the UAV can be determined based upon factors including (but not limited to) the number of people present within the scene, presence of a beacon indicating a subject of interest, the amount of motion within the scene, light levels, direction of illumination of the scene, and/or other environmental factors. The factors that can be considered by a UAV in determining a pose from which to capture an image of a scene typically depend upon the requirements of a specific application.

While much of the above discussion refers to UAVs configured as photography robots, UAVs in accordance with various embodiments of the invention can be configured with a variety of payloads and adapted for use in many applications including (but not limited to) applications in which efficient and/or unobtrusive hovering and navigation within a cluttered environment in advantageous. UAVs, ducted propulsion systems for UAVs, construction and operation of UAVs to reduce the noise generated by the rotors of the UAV, autonomous UAV navigation systems, and autonomous navigation processes that can be utilized by a UAV during image acquisition in accordance with various embodiments of the invention are discussed further below.

Ducted Rotor UAVs Capable of Operating in Cluttered Environments

A ducted rotor UAV in accordance with an embodiment of the invention is illustrated in FIGS. 1 and 2A-2G. Acquisition of images of people within a scene by a UAV in accordance with an embodiment of the invention is conceptually illustrated in FIG. 1. The UAV 10 autonomously navigates within an operating environment, which is typically cluttered necessitating high hovering efficiency and low speed maneuverability. During operation the UAV can utilize any of a variety of wireless communication technologies to exchange data with a variety of devices including local computing devices and remote servers. Examples of local computing devices can include (but are not limited to) smart phones, tablets, laptops, and/or a docking station. In the illustrated embodiment, the UAV 10 communicates with a remote server 12 and a mobile computing device 14 via a wireless gateway 16. In several embodiments, the UAV can communicate directly with the local computing device (14) via the wireless gateway or indirectly over the Internet 18 via a remote server 12. As is discussed further below, the UAV can utilize data connections to provide data for processing and/or to receive command and control instructions. In circumstances where multiple UAVs are active within the same operating environment, data connections can be utilized to share information concerning the operating environment including (but not limited to) maps and/or location information. In certain embodiments, multiple UAVs can form an ad hoc mesh network for the purpose of exchanging data including (but not limited to) location data.

In certain embodiments, the UAV returns to a docking station 20 when not in flight. In many embodiments, the docking station includes the capability to provide power to the UAV to recharge its batteries. Power can be delivered via contacts and/or wireless charging capabilities. In several embodiments, the docking station 20 incorporates fiducials and/or a beacon to guide the UAV. In a number of embodiments, the docking station can include a user interface 22, 24 to enable a user to provide instructions to the UAV such as (but not limited to) a launch command (22), a return command (22), and/or specifying the range of the UAV (24). In certain embodiments, the docking station incorporates the wireless gateway and provides Internet connectivity. In many embodiments, the docking station includes a computer system and the UAV is able to provide data to the docking station for processing. As can readily be appreciated, the capabilities of a docking station are typically dictated by the requirements of a specific application.

In a number of embodiments, a beacon 26 can be utilized to identify important people or subjects. For example, at a wedding or a birthday party beacons can be utilized to identify a person or people that should be prioritized (or excluded) in the framing of photographs. In certain instances, a UAV can follow a person with a beacon. In other embodiments, beacons can be utilized to define a flight path or a perimeter for a UAV. The beacons can utilize any of a variety of communication technologies including (but not limited to) infrared communications, and/or Bluetooth communications. As can readily be appreciated, beacons can be utilized to identify people and/or objects in any manner appropriate to the requirements of specific applications in accordance with embodiments of the invention.

Figure 1:
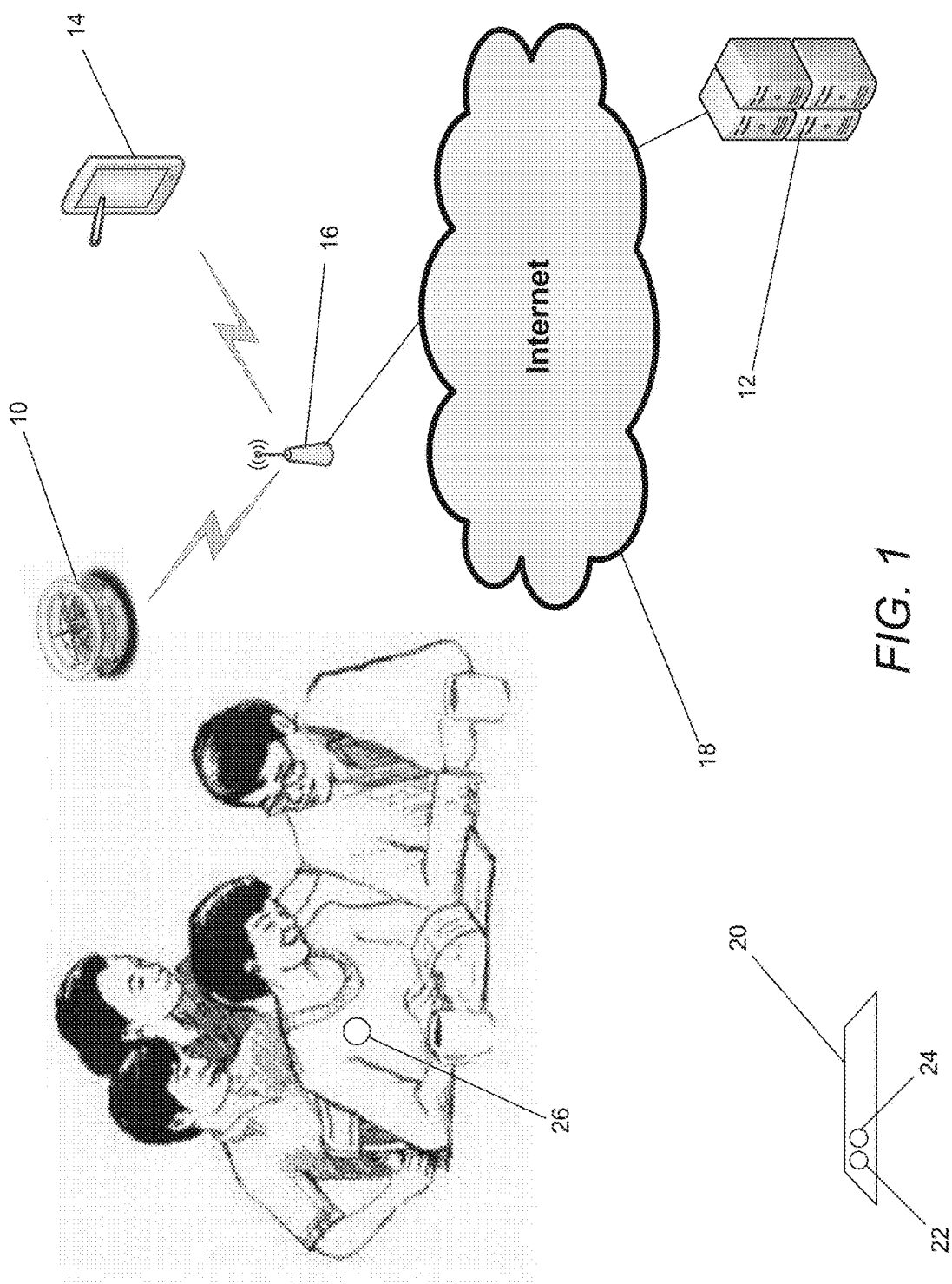
Figure 2A:
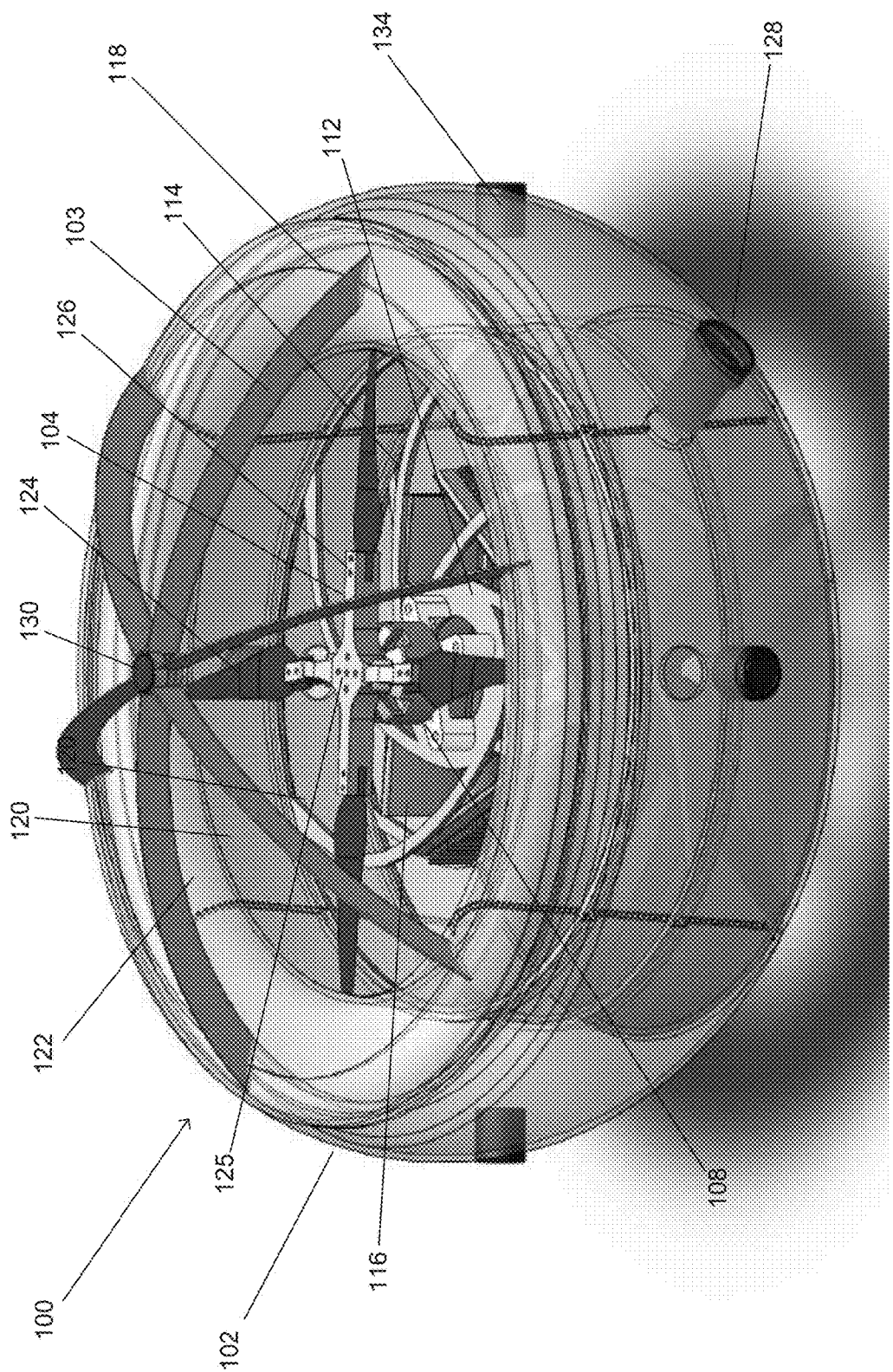
Figure 2B:
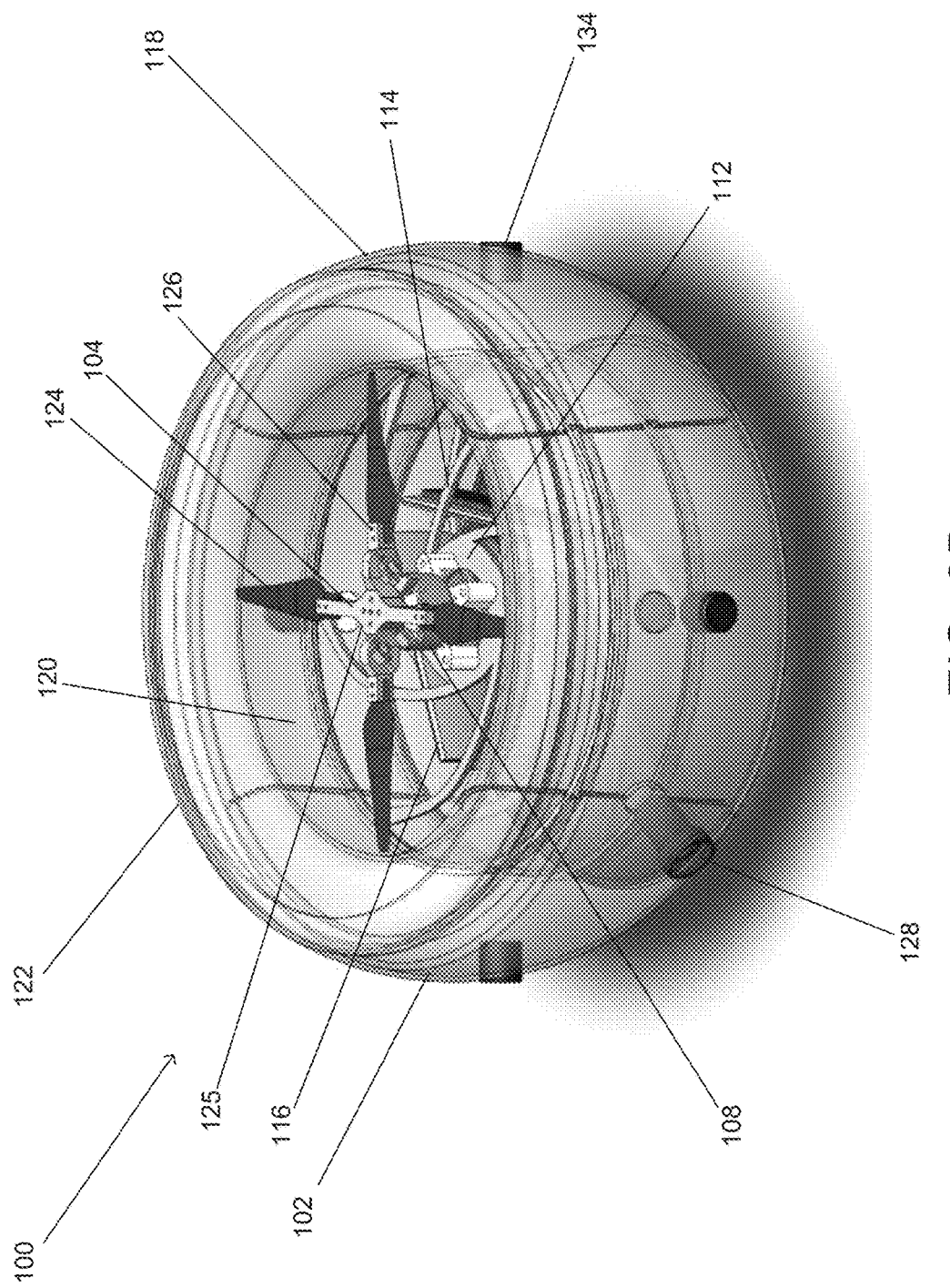
Figure 2D:
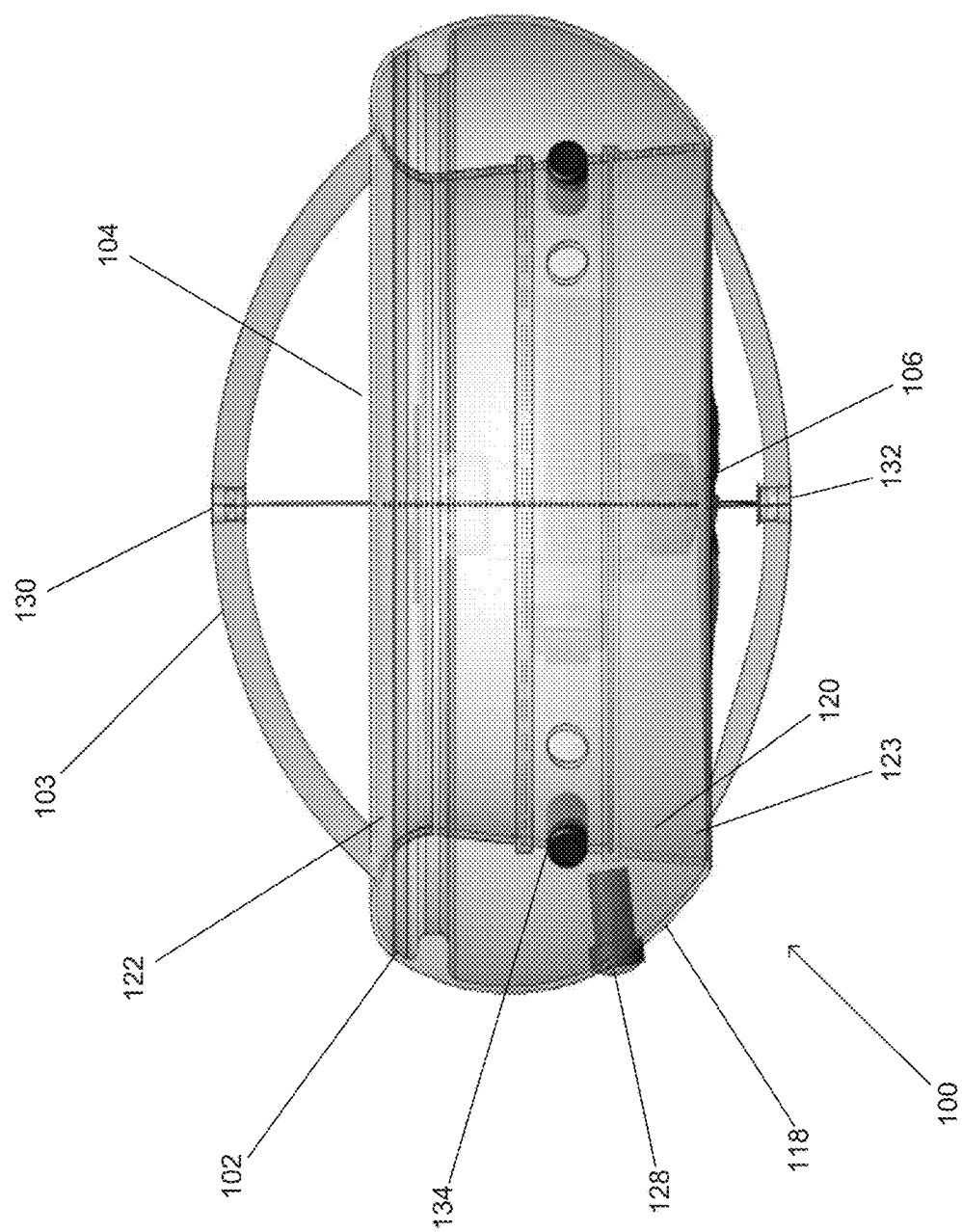
Figure 2E:
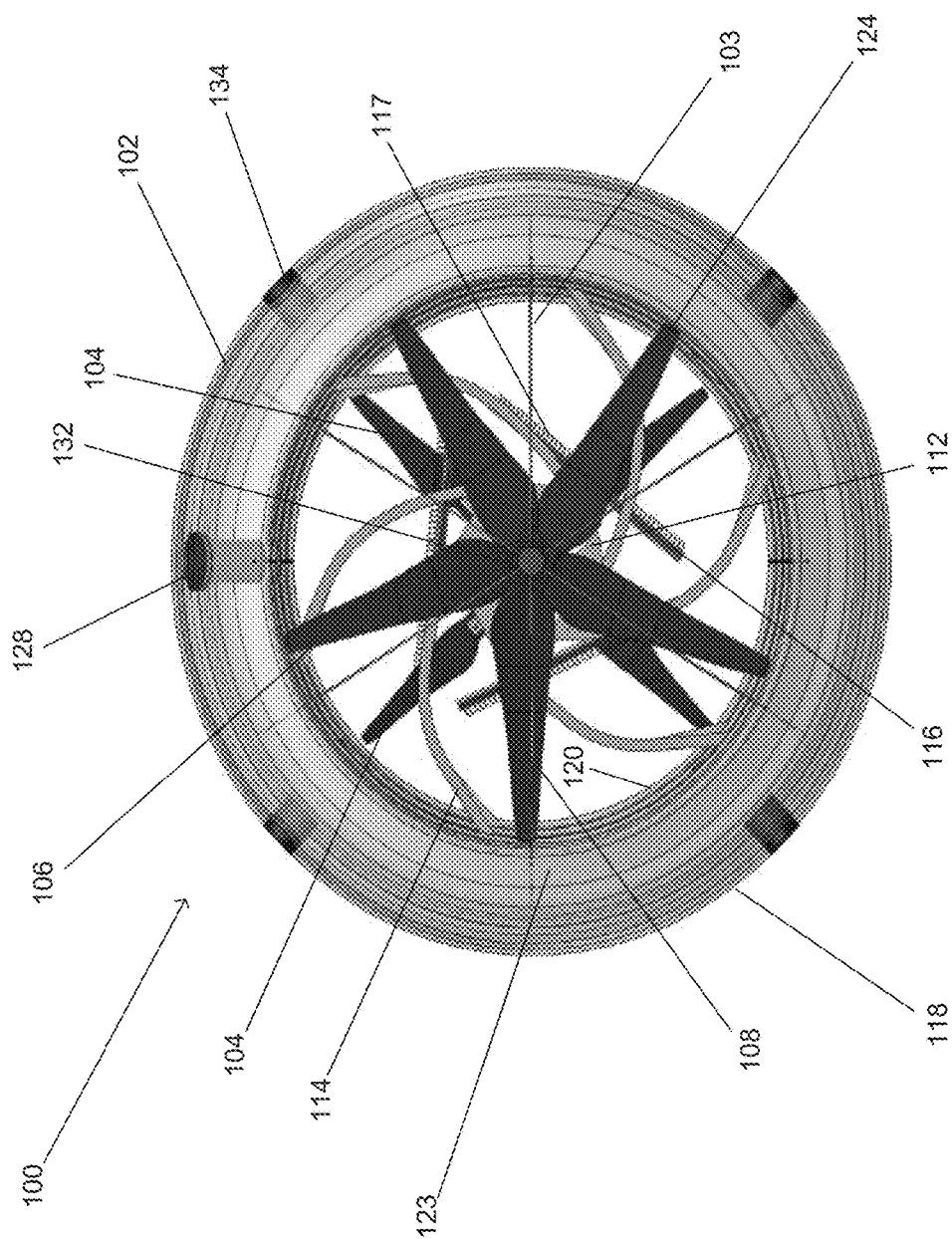
Figure 2F:
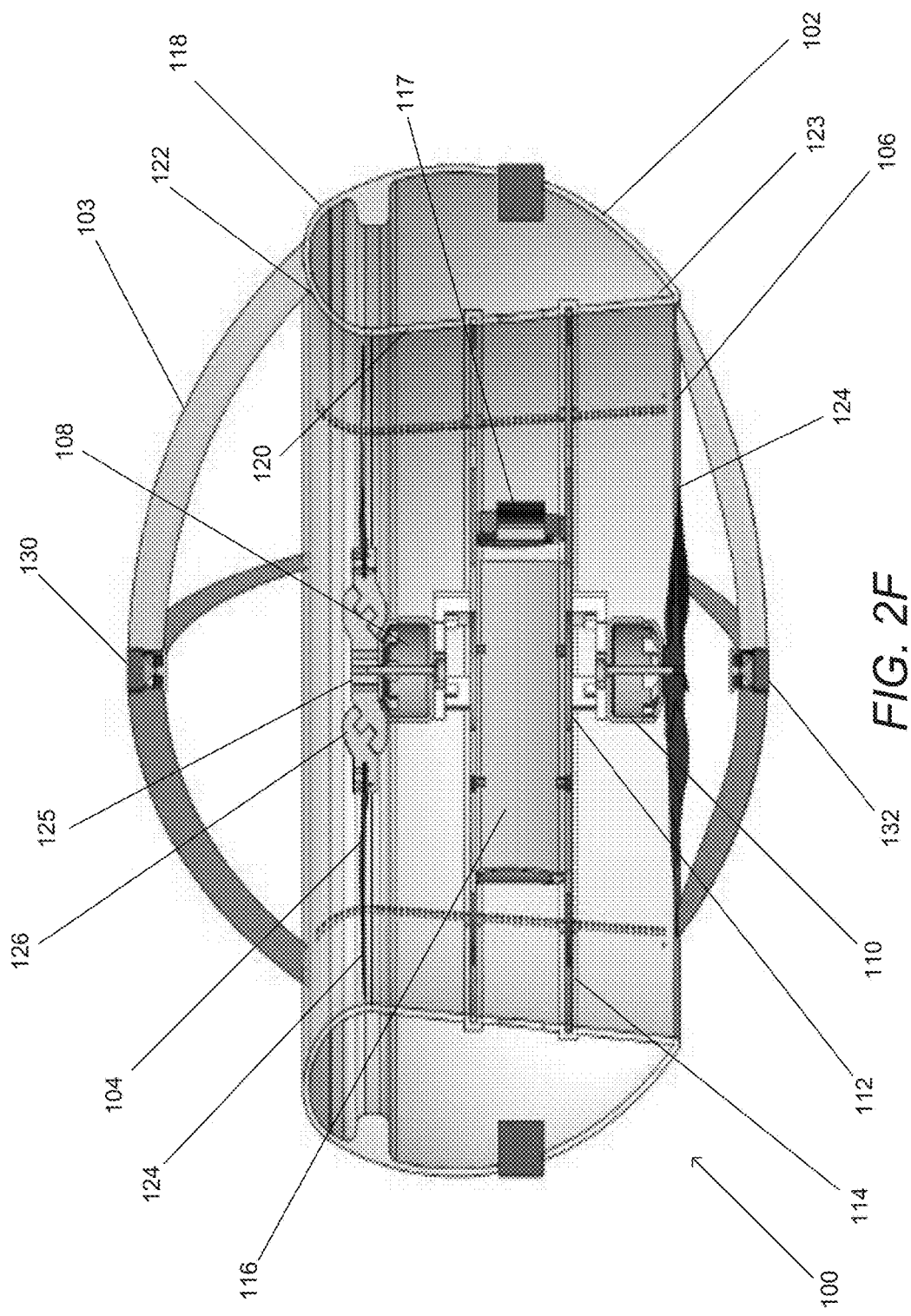
Figure 2G:
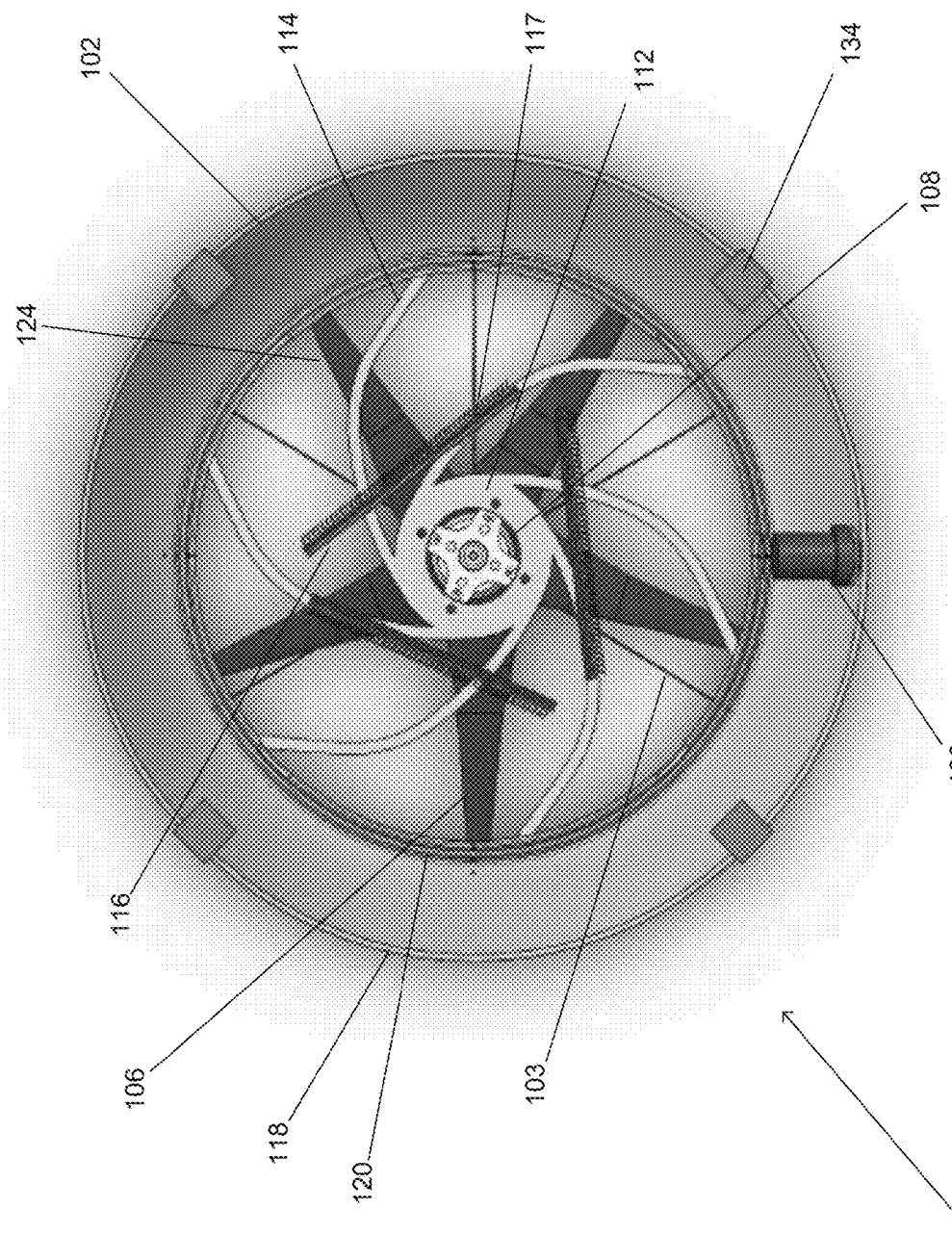

A UAV constructed in accordance with an embodiment of the invention is illustrated in more detail in FIGS. 2A-2G. The exterior of the UAV 100 is shown in FIG. 2A. The UAV 100 includes a housing 102 forming the duct of a ducted rotor propulsion system. In the illustrated embodiment, the openings in the housing are covered with a mesh 103. In several embodiments, the mesh is provided simply to prevent contact with the rotors. In other embodiments, the mesh is constructed from an acoustically opaque material that prevents line of sight pathways between the interior and exterior of the UAV. In order to better appreciate the construction of the UAV 100, the UAV 100 with the meshes 103 covering the housing 102 openings removed is shown in FIG. 2B.

Removing the mesh 103 reveals, the coaxial rotors 104, 106 utilized within the ducted propulsion system of the UAV. A first rotor 104 is mounted within an inlet opening in the duct formed by the housing 102 and a second rotor 106 is mounted within an outlet opening that is also formed within the housing. The rotors 104, 106 and the electric motors 108, 110 that apply torque to the rotors are supported on a support structure 112 that is connected to the duct formed by the housing 102 via multiple spiral shaped arms 114. As is discussed further below, the use of non-radial arms to support the rotors within the duct can significantly reduce noise generated by the UAV.

In several embodiments, electronic components including (but not limited to) printed circuit boards 116 on which devices such as (but not limited to) microprocessors, memory chips, and/or memory controllers can be located within the duct. Locating electronic components within the duct can provide the benefit of enabling airflow generated within the duct by the ducted rotor propulsion system to air cool the electronic components. In the illustrated embodiment, three printed circuit boards 116 that incorporate heat sinks 117 are mounted within the duct. In other embodiments, any of a variety of components and/or heat sinks can be located within the duct for air cooling. In alternative embodiments, the housing of the UAV can contain passageways that enable airflow from the rotors to pass over heat sinks that are not located within the primary duct of the UAV. As can readily be appreciated the packaging and/or cooling of electronic components within a UAV are typically dictated by the requirements of a specific application.

Exterior 118 and interior 120 surfaces of the housing form an inlet opening 122 and an outlet opening 123 of the duct containing the rotors 104, 106. The first rotor 104 draws air in through the inlet opening 122 and the rotors 104, 106 generate thrust by pushing air out the outlet opening. Although a single inlet opening and a single outlet opening are shown in the embodiment illustrated in FIGS. 2D and 2F, various UAV designs including multiple inlet and/or outlet openings are discussed below.

Each rotor 104, 106 includes multiple airfoil blades 124. As is discussed further below, the airfoil blades 124 of the first rotor 104 are connected to the rotor hub 125 via hinges 126. Opposing pairs of airfoil blades are hinged in what can be referred to as an underactuated rotor design. The use of an underactuated rotor to control attitude of a UAV and to dynamically control airfoil blade spacing is discussed further below. The second rotor 106 includes five fixed airfoil blades that are unevenly spaced. Although specific actuated and static rotor designs are illustrated in FIGS. 2A-2G, any of a variety of rotor designs can be utilized in the construction of a UAV in accordance with an embodiment of the invention including multiple radial rotors, rotors with even airfoil blade spacing, and/or rotors that utilize actuators and linkages to adjust attitude in a manner similar to a traditional helicopter rotor as appropriate to the requirements of a specific application in accordance with various embodiments of the invention.

While several mechanical systems are described above with respect to the UAV illustrated in FIGS. 2A-2G, any of a variety of alternative configurations can be utilized that incorporate a combination of features that reduce the extent to which humans perceive sound generated by the UAV. Accordingly, UAVs can be implemented in a variety of manners incorporating different ducted rotor propulsion systems and/or mechanical structures to those illustrated in FIGS. 2A-2G as appropriate to the requirements of specific applications in accordance with various embodiments of the invention.

In the embodiment illustrated in FIGS. 2A-2G, the UAV incorporates a primary camera 128 that is utilized to capture image data. In several embodiments, the primary camera 128 can also include one or more microphones. As noted above, the UAV can navigate through its operating environment opportunistically taking photographs of subjects of interest. In several embodiments, the UAV utilizes a machine vision system to perform autonomous navigation and identify subjects of interest. Alternatively, the machine vision system can be utilized for navigation and images captured by the primary camera can be utilized to identify subjects of interest. In several embodiments, a machine vision system is utilized to initially identify subjects of interest and navigate the UAV into a desired pose and images captured by the primary camera are utilized to refine the location of the subject of interest and/or update the desired pose of the UAV. As discussed further below, image data in a number of channels including (but not limited to) color, depth, near-infrared, and/or infrared channels can be utilized to identify subjects of interest. In many embodiments, image data is analyzed using face detection processes that can provide information concerning the location and/or pose of a detected face. In other embodiments, any of a variety of object classifiers can be utilized to detect subjects of interest. In certain embodiments, the subject of interest sought by the UAV can depend upon a variety of other inputs including (but not limited to) time, and/or audio information. For example, an audio classifier can be utilized to detect specific songs such as (but not limited to) "Happy Birthday to You" or the "Bridal Chorus" composed by Richard Wagner and the UAV can modify its behavior to seek out specific subjects based upon context. As can readily be appreciated, any of a variety of sensors and/or classifiers can be utilized to determine environmental information and modify UAV behavior as appropriate to the requirements of specific applications in accordance with embodiments of the invention.

Once a subject of interest is identified, the UAV can utilize a number of heuristics to select a relative pose from which to capture an image of the subject of interest. The UAV can navigate to the location of the pose and capture an image of the subject of interest using the primary camera. In several embodiments, the primary camera is continuously capturing images and/or audio of a subject of interest as the UAV moves into a desired pose. While the primary camera 128 is shown as fixed to the UAV housing 102 in the illustrated embodiment, the primary camera can be mounted to a pan/tilt unit and/or a gryostabilized gimbal.

Any of a variety of machine vision systems can be utilized to capture video data for the purposes of performing functions including (but not limited to) V-SLAM, object detection and/or avoidance, and/or depth sensing. In the illustrated embodiment, a stereo pair of cameras 130, 132 with 360 degree field of view optical systems is utilized to acquire image data. In several embodiments, the image data is captured in color, near-infrared and/or infrared color channels. The 360 degree field of view optical systems enables the machine vision system to detect and track features irrespective of the orientation of the UAV within the environment. The presence of a stereo pair of cameras enables depth estimation by performing disparity searches within images captured simultaneously by the stereo pair of cameras. The combination of the image data and the depth information can be utilized to perform V-SLAM, and/or object detection and/or avoidance. As can readily be appreciated, any of a variety of machine vision systems that can be utilized to perform SLAM and/or object detection including (but not limited to) LIDAR systems, multiple stereo pairs of cameras, multi-baseline array cameras, time of flight cameras, and/or structured illumination cameras can be utilized as appropriate to the requirements of specific applications in accordance with various embodiments of the invention. With specific reference to SLAM processes, UAVs in accordance with many embodiments of the invention incorporate one or more cameras having telecentric lenses for the purpose of measuring motion using optical flow. In several embodiments, SLAM processes are enhanced utilizing an inertial measurement unit that can contain accelerometers, magnetometers and/or gyroscopes.

In the illustrated embodiment, the stereo pair of cameras 130, 132 is augmented by a number of sonar sensors 134 located around the perimeter of the housing 102 of the UAV 100. The sonar sensors 134 provide the UAV 100 with the ability to detect the proximity of objects as a second object detection modality that can augment object detection processes performed using image data captured by the stereo pair of cameras 130, 132. As can readily be appreciated, alternative configurations of sonar sensors and/or alternative sensor systems can be utilized to perform object detection and/or ranging as appropriate to the requirements of specific applications in accordance with embodiments of the invention.

Before discussing the electrical systems and software utilized to control flight and autonomously navigate UAVs in accordance with various embodiments of the invention, the various techniques for modifying and/or reducing noise generated by UAVs described above with reference to FIGS. 2A-2G and other alternative techniques are explored in further detail below.

Underactuated Rotor Design

UAVs in accordance with many embodiments can utilize at least one rotor that incorporates at least one opposing pair of underactuated airfoil blades. The use of underactuated rotor designs to control attitude of a coxial rotor UAV is described in detail in Patent Cooperation Treaty Application No. PCT/US2014/027841 incorporated by reference above and James Paulos and Mark Yim "An Underactuated Propeller for Attitude Control in Micro Air Vehicles" *Intelligent*

*Robots and Systems (IROS). 2013 IEEE/RSJ International Conference on.* IEEE, 2013 the relevant disclosure from which related to the use of underactuated rotors to control attitude of a UAV is hereby incorporated by reference in its entirety. The manner in which an underactuated rotor can be utilized for attitude control in a UAV can be appreciated by reviewing FIGS. 3A and 3B, which are reproduced from the Paulos and Yim paper. An underactuated rotor 200 including a pair of airfoil blades 202, 203 attached via hinges 204, 205 to the hub 206 of the rotor is illustrated in FIGS. 3A and 3B. The axes of the hinges 204, 205 lie in the same plane as the plane of rotation of the rotor 200. The axes of rotation 208, 209 of the hinges 204, 205 are not, however, parallel to the axis of rotation as would be found in typical helicopter rotors. The airfoil blade denoted the 'positive' airfoil blade 202 has the top of its hinge axis 208 inclined towards the central shaft 210. Conceptually, this 'positive' airfoil blade responds to an impulsive torque on the hub 206 by flexing backwards and exposing increased blade pitch. Similarly, a retrograde torque causes the 'positive' airfoil blade 202 to flex forwards on its hinge 204 and decrease its pitch. The opposing 'negative' airfoil blade 203 has the top of its hinge axis 209 inclined away from the central shaft 210, and the complementary geometry creates an opposite response to torques. By superimposing a sinusoidal torque at the rotor frequency on top of the steady torque needed to balance rotor drag, a cyclic oscillation in blade pitch is induced that is phase locked with the rotor position. Controlling torque can also be utilized to dynamically control airfoil blade spacing in underactuated rotors having more than two airfoil blades. The use of rotors having uneven airfoil blade spacing in UAVs to modify the power spectrum of sound generated by the UAV is discussed further below.

Uneven Blade Spacing for Noise Spectral Shaping

Rotors typically incorporate evenly spaced airfoil blades that are as close to identical as possible. Distributing airfoil blades with the same shape and weight evenly around the rotor evenly balances the rotor, which can reduce rotor vibration to acceptable levels. While use of evenly spaced airfoil blades is a simple way to balance a rotor, the even spacing of the airfoil blades typically results in the generation of acoustic pressure waves at harmonics related to the blade passage frequency of the rotor. The result is a buzzing sound characteristic of many conventional UAVs that employ rotors often likened to the sound of a swarm of bees or a buzz saw. The power spectrum of an evenly spaced rotor such as the five airfoil blade rotor 300 illustrated in FIG. 4A is conceptually illustrated in FIG. 4B.

UAVs in accordance with several embodiments of the invention utilize balanced rotors having uneven blade spacing. The benefits of uneven blade spacing on the power spectrum of sound generated by the rotor 400 shown in FIG. 4C including five unevenly spaced airfoil blades is conceptually illustrated in FIG. 4D.

Figure 4F:
FIG. 4F illustrates a rotor including four unevenly spaced airfoil blades in accordance with an embodiment of the invention.
Figure 4E:
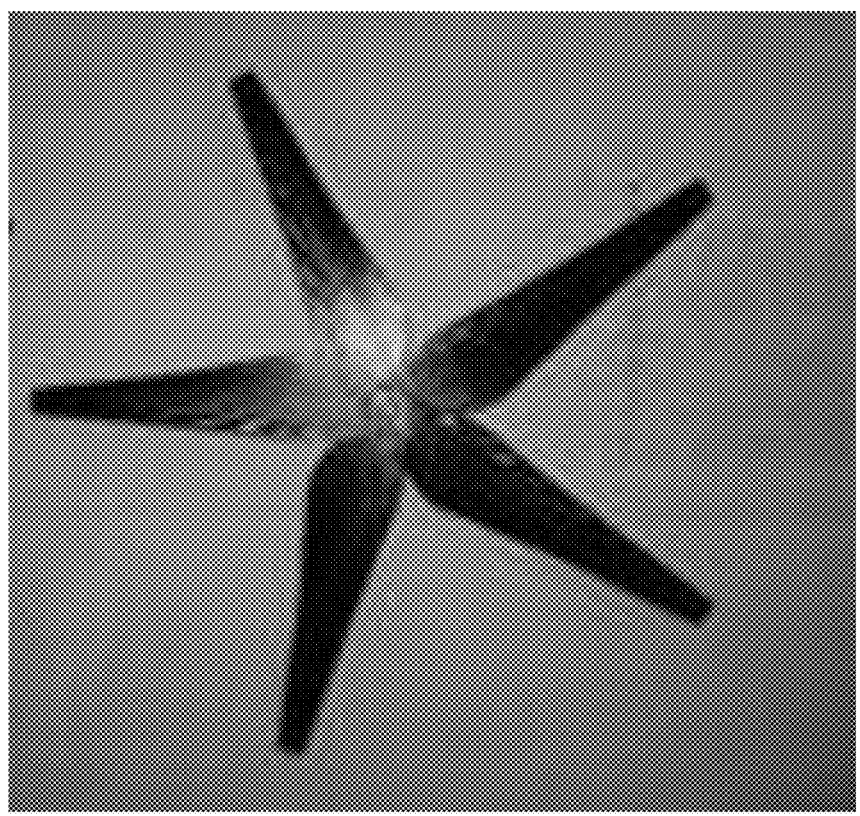
FIG. 4E illustrates a rotor including five unevenly spaced airfoil blades in accordance with an embodiment of the invention.

In several embodiments, uneven spacing is achieved through the use of an underactuated or any other hinged-blade rotor. By driving the rotor using appropriate torques the spacing of the airfoil blades can be controlled to achieve a distribution having uneven spacing. In many embodiments, rotors including fixed airfoil blades that are constructed with uneven spacing are utilized. When fixed airfoils are utilized, the construction of the various airfoil blades utilized in the construction of the rotor can be modified to achieve a balanced rotor. The modifications typically involve the judicious azimuthal placement of blades around the hub, and/or using airfoils having the same shape, but different weights. In other embodiments, however, lightweight unbalanced rotors and/or rotors including different airfoil blade shapes can be utilized as appropriate to the requirements of specific applications. A rotor 450 including five unevenly spaced airfoil blades is illustrated in FIG. 4E and a rotor 475 including four unevenly spaced airfoil blades is illustrated in FIG. 4F.

Although various rotor designs incorporating airfoil blades that are unevenly spaced are described above with reference to FIGS. 4A-4F, any of a variety of rotor designs including (but not limited to) rotors with evenly spaced airfoil blades can be utilized to implement UAVs as appropriate to the requirements of specific applications in accordance with embodiments of the invention. The use of ducts to suppress noise emission by UAVs in accordance with certain embodiments of the invention is discussed further below.

Designing Ducts for Reduced Noise Emission

Ducted fans are well known sources of propulsion in the aerospace industry and the ducts utilized in ducted fan propulsion systems are primarily designed to maximize thrust. While UAVs in accordance with many embodiments of the invention that utilize ducted rotors achieve benefits of increased thrust relative to equivalent propellers in an open propulsion system, the ducts also serve the additional benefit of reducing the directions from which a direct line of sight to the rotors is available. Furthermore, the ducts can be designed to decrease noise emissions by the UAV.

In a number of embodiments, at least a portion of the interior surface of the duct incorporates a noise absorptive material. In certain embodiments, the interior surface of the duct is perforated to admit acoustic pressure waves and an internal cavity of the housing of the UAV contains a noise absorptive material such as (but not limited to) fiberglass, foam, and/or honeycomb materials. In other embodiments, the interior surface may itself be an acoustically absorptive material. The presence of noise absorptive materials within the duct can reduce noise emissions by absorbing pressure waves generated by the rotors and motors that are incident upon the interior walls of the duct.

In several embodiments, emission of noise by pressure waves that are directed out of the intake and outlet openings of the duct of a UAV can be reduced by modifying the size and shape of the intake and outlet openings. In many embodiments, noise absorptive baffles are placed in the intake and outlet openings of the UAV to mute the acoustic pressure waves generated by the rotors and motors. In a number of embodiments, noise absorptive meshes cover the inlet and outlet openings of the duct to prevent line of sight propagation of acoustic pressure waves generated by the rotors and motors out of the inlet and outlet openings.

Figure 5A:
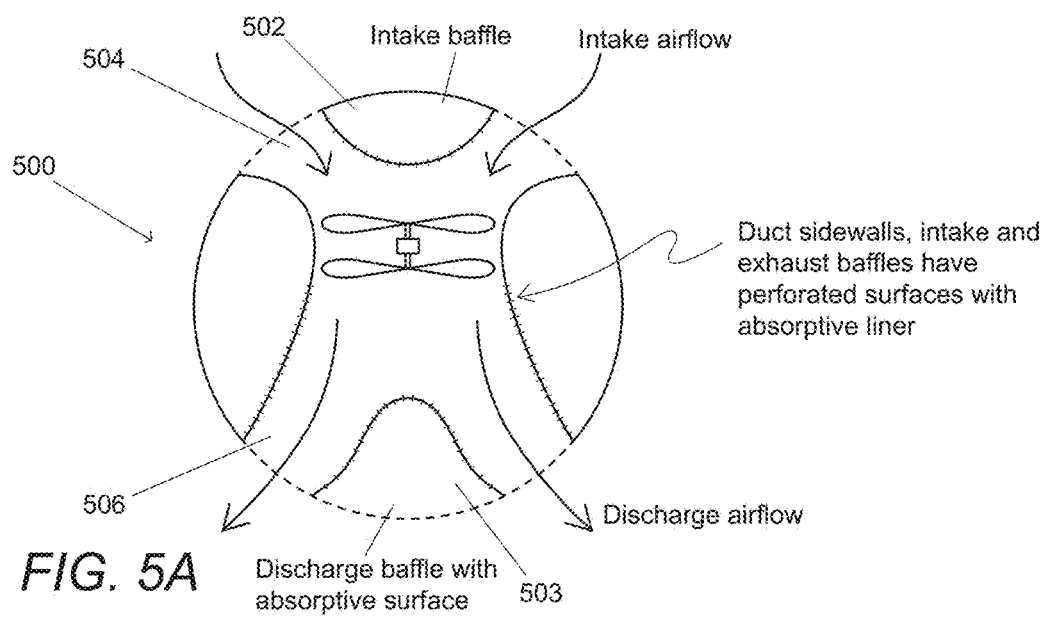
FIG. 5A illustrates an UAV including noise absorptive baffles located within inlet and outlet openings of the UAV's duct in accordance with an embodiment of the invention.
Figure 5B:
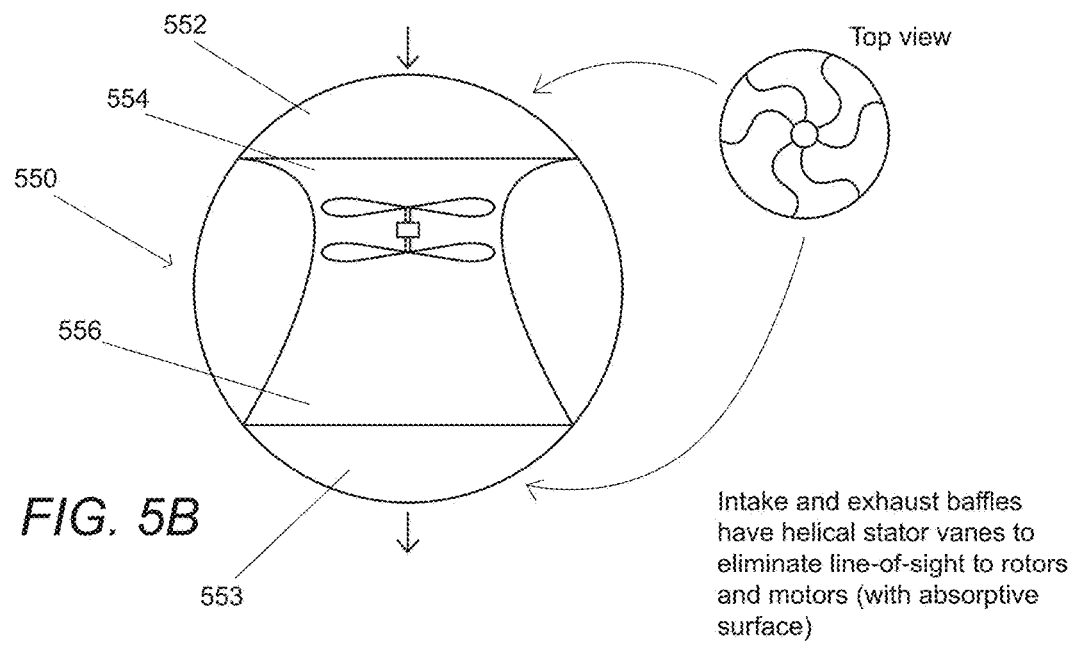
FIG. 5B illustrates an UAV including noise absorptive meshes located across inlet and outlet openings of the UAV's duct in accordance with an embodiment the invention.

An UAV 500 including noise absorptive baffles 502, 503 located within the inlet 504 and outlet 506 openings of the UAV's duct in accordance with an embodiment of the invention is illustrated in FIG. 5A. An UAV 550 including noise absorptive meshes 552, 553 located across the inlet 554 and outlet 556 openings of the UAV's duct in accordance with an embodiment the invention is illustrated in FIG. 5B. In certain embodiments the noise absorptive meshes include layers of helical stators to prevent direct line of site propagation of acoustic pressure waves from the rotors and/or motors out either of the inlet 554 or outlet 556 openings.

Although various techniques for reducing noise emissions via openings in ducts of UAVs are described above with reference to FIGS. 5A and 5B, any techniques that can be utilized to attenuate acoustic pressure waves generated by the mechanical components of a UAV while permitting adequate airflow to generate required thrust can be utilized as appropriate to the requirements of specific applications in accordance with embodiments of the invention. Furthermore, many UAVs in accordance with embodiments of the invention do not utilize any mechanism to attenuate acoustic pressure waves generated by the rotors and motors and emitted via the inlet and/or outlet openings of the UAV's duct(s). Various techniques for mounting rotors and/or motors within the duct of a UAV to modify the thrust produced by the coxial rotors and the character of the sound generated by a UAV in accordance with embodiments of the invention are discussed further below.

Rotor Mounting

Figure 6A:
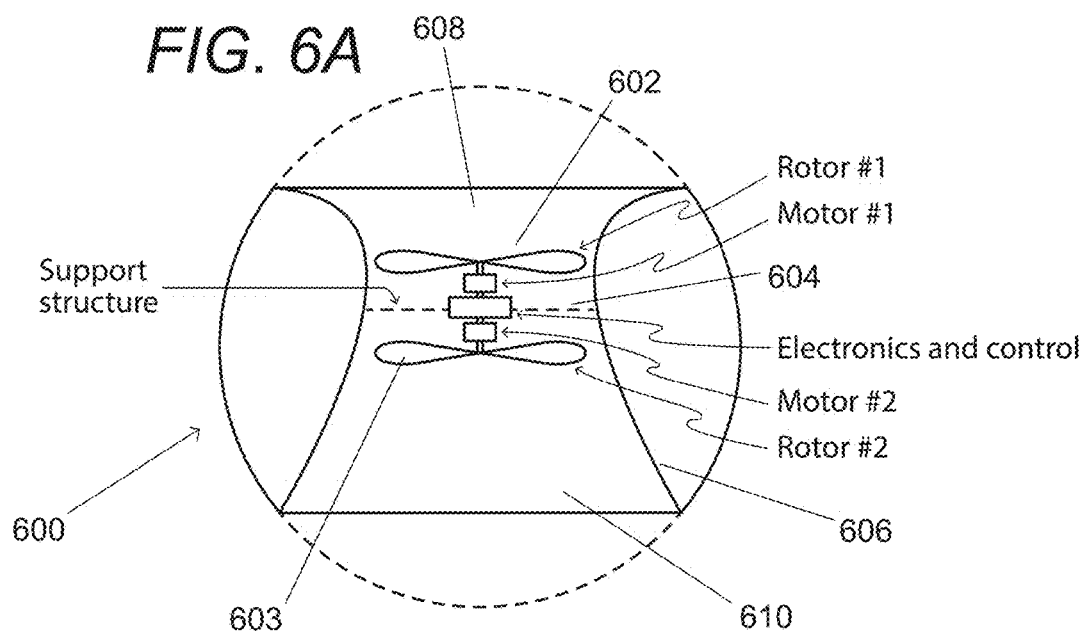
FIG. 6A illustrates an UAV including a pair of rotors mounted to the same support structure within a duct in accordance with an embodiment of the invention.

UAVs in accordance with many embodiments of the invention include coaxial rotors mounted within a duct. In the embodiment illustrated in FIGS. 2A-2G, the coaxial rotors are mounted in the inlet and outlet openings respectively. Furthermore, the motors that apply torque to the rotors are mounted to the same support structure. In other embodiments, the rotors can be mounted in different locations within a duct compared to the rotor mounting locations shown in FIGS. 2A-2G. Furthermore, the motors that supply torque to the rotors can be mounted on separate support platforms. An UAV 600 including a pair of rotors 602, 603 mounted to the same support structure 604 within a duct 606 in accordance with an embodiment of the invention is illustrated in FIG. 6A. The first rotor 602 is mounted in the inlet opening 608 and the second rotor 603 is mounted immediately below the first rotor (i.e. internal to the duct as opposed to at the outlet opening 610 of the duct).

The UAV's acoustic signature can be strongly affected by positioning of the rotor(s) within the duct and by proximity of the rotor planes. The most efficient positioning typically places a rotor at the throat (minimum diameter) of the duct. This increased efficiency allows rotor speed to be reduced, resulting in less noise emission. Proximity of two rotors can also affect the noise profile of the UAV, because of turbulence generated by the upstream rotor impinging on the downstream rotor, causing pressure fluctuations that can manifest as noise.

Figure 6B:
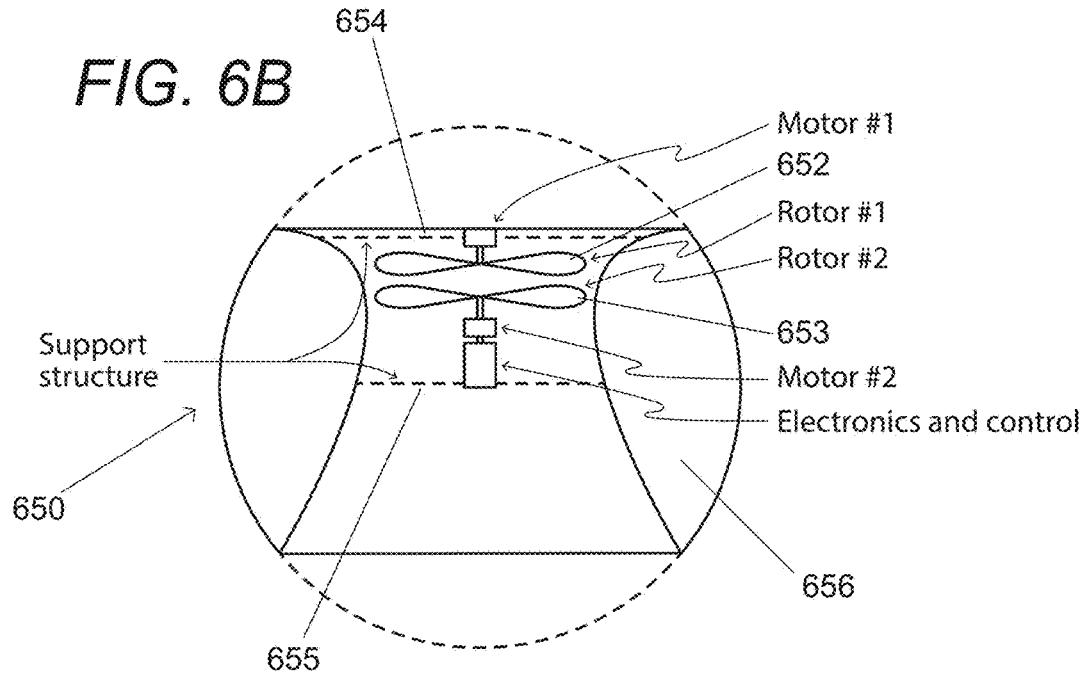
FIG. 6B illustrates an UAV including a pair of rotors mounted to different support structures within a duct in accordance with an embodiment of the invention.

An UAV 650 including a pair of rotors 652, 653 mounted to different support structures 654, 655 within a duct 656 in accordance with an embodiment of the invention is illustrated in FIG. 6B. As can readily be appreciated, the use of separate support structures means that the motors and/or additional components of the UAV can be mounted between the duct outlets and the rotors. Using this mounting configuration, the rotors can be spaced arbitrarily close to each other.

Proximity of the rotors is influenced by the physical constraints of the mounting structure and the additional space required for rotor flapping. In addition, rotors placed in very close proximity tend to experience reduced efficiency and increased noise, due to the turbulence impinging on the downstream rotor. In the case of a ducted coaxial rotor system, these proximity effects are traded off against beneficial placement within the duct.

In addition to modifying the thrust generated by the ducted rotor propulsion system, the design of the rotor system within the duct can significantly impact the character of the sound produced by an UAV. As an airfoil blade travels over a surface, the air between an airfoil blade and the surface is compressed generating sound with a frequency determined based upon the blade passage frequency of the rotor. By designing support structures within the duct of the UAV so that an airfoil blade only passes over a very small portion of the surface area of the support structure at any given time as it rotates, sound due to compression of air between an airfoil blade and a support structure can be reduced.

As discussed above with reference to FIGS. 2A-2G, an airfoil blade passing over a surface can produce a pressure pulse which adds to the basic rotor noise. Support structure which aligns with the span of the rotor blade, such as the radial struts 702 illustrated in the UAV 700 shown in FIG. 7A, produces the strongest pressure pulse. Non-radial supports produce lower strength pulses. Support structures incorporating spiral arms can be utilized to support motors and/or rotors within a duct of a UAV. Ideally the curvature of the spiral arm should be opposite to the curvature of the leading edge of the airfoil blades of the rotor to reduce surface area overlap between the radial arms and the airfoil blades during rotation of the rotor. An UAV 750 including a support structure 752 having spiral arms 754 in accordance with an embodiment of the invention is illustrated in FIG. 7B. Other appropriate configurations can include (but are not limited to) the use of support structures 776 including straight arms 778 that do not extend radially across the duct as shown in the UAV 775 illustrated in FIG. 7C.

In addition to the mechanical design of the duct and support structures within a ducted rotor propulsion system, the manner in which the rotors are rotated can impact the noise profile of an UAV. If two rotors are generating almost-equal frequencies, their sounds combine to alternately cancel and reinforce, producing an audible "beat". Human audio perception is highly attuned to the detection of beats. Therefore, a beat frequency caused by two almost-equal rotor frequencies is likely to readily intrude upon the consciousness of people within the vicinity of the UAV containing the rotor. Beat frequencies are most likely to be generated in ducted rotor propulsion systems that utilize two rotors with nearly-equal blade passage frequencies. The presence of beat frequencies within the sound produced by a UAV can be reduced by selecting number of airfoil blades/RPM combinations for each rotor that are widely dissimilar to the other rotor.

Although specific rotor mounting locations and support structure configurations are described above with respect to FIGS. 6A-7C, any of a variety of rotors and mounting techniques can be utilized in UAVs incorporating ducted rotor propulsion systems as appropriate to the requirements of specific applications in accordance with various embodiments of the invention.

Airfoil Blade Design

A primary source of noise generated by a UAV in accordance with an embodiment of the invention is the generation of acoustic pressure waves by rotation of the airfoil blades of the UAV's rotors. UAVs in accordance with several embodiments of the invention utilize airfoil blades shaped to reduce the amount of noise generated due to rotation of the rotor.

Figure 8A:
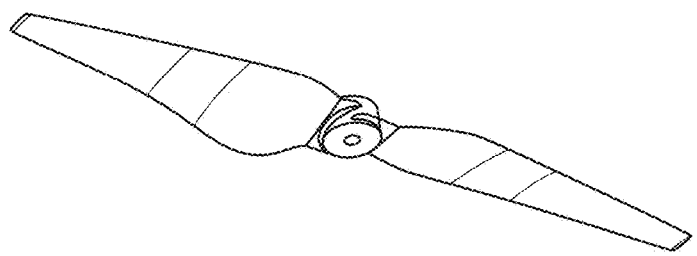
Figure 8B:
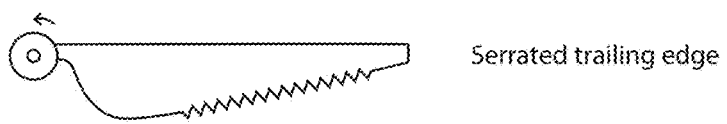
Figure 8C:
Figure 8D:
Figure 8E:
Figure 8F:

A variety of blade shapes that can be shown to be beneficial for reducing noise at low Reynolds numbers are illustrated in FIGS. 8A-8F. FIG. 8A is a typical baseline rotor blade designed for efficiency, but with no specific features designed for noise reduction. FIG. 8B shows an airfoil blade including a serrated trailing edge, which can reduce rotor broadband noise by shedding the trailing edge vortices in a gradual transition, reducing turbulence and noise. FIG. 8C illustrates an airfoil blade including serrations on the leading edge, which are intended to smooth the transition into the ambient air and reduce the sharpness of the pressure pulse characterizing each blade passage. FIG. 8D shows a wide chord airfoil blade intended to maintain a desired level of lift while reducing the rotational speed of the rotor. A reduced rotational speed can translate into reduced noise. FIG. 8E illustrates an airfoil blade having a scimitar blade shape, intended to reduce the impulsiveness of the airfoil blade noise by spreading the blade passage pressure rise over a broader angle as the airfoil blade passes an observer. FIG. 8F shows an airfoil blade having a spanwise reverse sweep intended to combine some of the acoustic benefits of the scimitar blade shape, while maintaining a more constant, or elliptical-shaped spanwise blade loading. A constant spanwise loading can be acoustically preferable to a highly-loaded tip.

While various airfoil blade designs are described above with reference to FIGS. 8A-8F, any of a variety of airfoil blade designs can be utilized in rotors of UAVs including different airfoil blades on a single rotor or multiple rotors with different airfoil blade designs as appropriate to the requirements of specific applications in accordance with embodiments of the invention. Furthermore, any combination of the various design technique to modify and/or reduce the noise emitted by a UAV described above with reference to FIGS. 3A-8F can be utilized in the design of a UAV in accordance with an embodiment of the invention. The manner in which the flight of a UAV in accordance with an embodiment of the invention can be controlled is now discussed in detail below with reference to various software and electronics architectures that can be utilized in UAVs in accordance with numerous embodiments of the invention.

UAV Hardware Architecture

UAVs in accordance with various embodiments of the invention typically utilize a variety of electrical components to implement the flight system, machine vision system, autonomous navigation system, and system applications. Electrical components of an UAV in accordance with an embodiment of the invention are illustrated in FIG. 9A. The UAV electrical system 900 includes three main computer processing systems. A flight management unit (FMU) 902 handles all of the computation associated with controlling the rotors within the ducted propulsion system of the UAV. A separate robotics processing unit (RPU) 904 is responsible for the autonomous navigation of the UAV. The third processing system is the application processing unit (APU) 906, which is responsible for processing associated with the high level behavior of the UAV. In the illustrated embodiment, the UAV is configured as a photography robot and the APU handles the processing associated with functions including (but not limited to) identification of subjects of interest, pose selection, and/or image and/or audio acquisition. Each processing unit will typically include a microprocessor and/or an additional coprocessor Although a UAV electrical system including three processing systems is illustrated in FIG. 9A, a single or any number of processing systems can be utilized in an electrical system for a UAV as appropriate to the requirements of specific applications in accordance with various embodiments of the invention.

The FMU 902 provides signals to a motor controller 910 that in turn generates drive signals that are provided to the motors 912, 914 that can drive rotors in a ducted rotor propulsion system. In embodiments that include an underactuated rotor, the FMU can determine the appropriate impulsive torque to apply to the underactuated rotor to both perform attitude control and/or to dynamically achieve uneven blade spacing. In many embodiments, the FMU 902 receives sensor input from a variety of sources including (but not limited to) an inertial measurement unit (IMU) that can include accelerometers and/or gyroscopes that enable the use of feedback control in the driving of the motors of the UAV. Although the motor controller 910 is shown as controlling two motors in FIG. 9A, one or more motor controllers can be provided that can be utilized to control any number of rotors in UAVs that include multiple radial rotors in accordance with various embodiments of the invention.

The RPU 904 can utilize a variety of processes to perform autonomous navigation. In several embodiments, the RPU 904 utilizes one or more sense and avoid modules to detect and avoid objects as a basic behavior. In the illustrated embodiment, a sense and avoid module 920 includes a stereo pair of cameras 922, 924. To assist with depth estimation in portions of the field of view of the stereo pair of cameras 922, 924 that include an absence of texture, an infrared projector system 926 is provided to project texture. In several embodiments, a dedicated depth processor 928 is provided to perform disparity searches within the images captured by the stereo pair of cameras and produce depth maps. In a number of embodiments, depth maps generated by analyzing images captured by the stereo pair of cameras 922, 924 can be augmented with proximity information obtained by a point distance sensor such as (but not limited to) a sonar sensor. In the UAV 100 illustrated in FIGS. 2A-2G a pair of stereo cameras 130, 132 with 360 degree fields of view are utilized to capture image data and a number of sonar sensors 134 are distributed around the body 102 of the UAV. In other embodiments, multiple sense and avoid modules can be provided around the body of a UAV and/or depth information can be provided by alternative classes of sensors including (but not limited to) LIDAR, time of flight cameras, and/or structured light cameras.

In a number of embodiments, the image data and/or depth maps obtained by the sense and avoid module(s) 920 is combined with sensor data from an optical flow camera 932 such as (but not limited to) a camera with a telecentric lens to perform V-SLAM. In certain embodiments, information from the IMU 916 can also be utilized when performing V-SLAM. As can readily be appreciated, the maps and the estimations of pose within the maps obtained using V-SLAM processes can then be utilized by the RPU 904 to perform motion planning to navigate to a desired pose that may be dictated by the APU 906 or by a basic UAV behavior such as (but not limited) a need to navigate to a docking station based upon a low power level, and/or obstacle avoidance. As can readily be appreciated, any of a variety of motion planners can be utilized in accordance with embodiments of the invention including motion planners designed to reduce the generation of noise proximate to people within the operating environment of the UAV.

The APU 906 performs processing associated with implementing the high level functionality of the UAV as a robotics platform. As can readily be appreciated, any of a variety of applications can be performed by UAVs in accordance with different embodiments of the invention. In the illustrated embodiment, the UAV is configured as a photography robot incorporating a primary or main camera 940 that is utilized to capture images, and/or audio and/or video. Software processes performed by the APU 906 can be utilized to identify subjects of interest within image data captured by the sense and avoid modules 920 and/or main camera 940. The software processes can reference maps generated by the RPU 904 and indicate a desired pose for the UAV to the RPU. In this way, the APU can cause the RPU to autonomously navigate the UAV into positions from which it can capture images and/or audio of subjects of interest.

In the illustrated embodiment, the UAV electronics 900 includes a variety of data communication modules including a WiFi module 942, a Bluetooth module 944, and a cellular data module 946. In a number of embodiments, the Bluetooth module 944 can be utilized to identify beacons that identify subjects of interest, define perimeters for an operational area of the UAV, and/or identify the location of the UAV's docking station. As can readily be appreciated, any of a variety of wireless and/or wired communication interfaces can be provided within the electronics system of a UAV as appropriate to the requirements of specific applications in accordance with various embodiments of the invention.

Power is a principal concern of most untethered robotics platforms and UAVs in accordance with many embodiments of the invention utilize a UAV docking station to recharge a battery that is utilized to power the UAV during flight. A power system of a UAV and its docking station in accordance with an embodiment of the invention is illustrated in FIG. 9B. The power system 950 includes a power socket 952 into which a docking station power cord is plugged that provides power to a docking station power supply 954. The docking station includes a connector 956 (and/or wireless charging antenna) that connects with a connector 958 (and/or wireless charging antenna) on the UAV. Power is provided from the power supply 954 of the docking station via the connectors 956, 958 to the charger 960 of the UAV, which is used to charge the UAV battery 962. As can readily be appreciated, any of a variety of techniques can be utilized to charge and/or swap out the battery of a UAV as appropriate to the requirements of specific application in accordance with embodiments of the invention.

Much of the functionality of the UAV described above is performed by the various processing units provided within the electronics of the UAV. Software systems that can be utilized to configure the capabilities of the processing units provided within UAVs in accordance various embodiments of the invention are discussed further below.

UAV Software Architecture

A software architecture that can be utilized by an UAV in accordance with an embodiment of the invention is illustrated in FIG. 10. The software architecture 1000 is utilized in a UAV having two motors 1002, 1004 within a ducted rotor propulsion system, an IMU 1006, a sense and avoidance module (SAM) 1008, and an optical flow camera 1010. When the UAV is configured as a photography robot, the architecture 1000 also includes a main camera 1012.

A motor microcontroller 1014 can generate signals to drive the motors 1002, 1004. A FMU 1016 can generate commands for the motor microcontroller 1014 based upon sensor input received from the IMU 1006 and/or other sensors including (but not limited to) a SAM. In addition, the FMU can respond to commands received from a RPU 1018 and/or an APU 1020.

The RPU 1018 can utilize inputs received from the SAM 1008 and/or the optical flow camera 1010 to perform object detection and/or avoidance, and/or SLAM. The RPU can also perform autonomous navigation based upon sensor inputs and/or instructions received from the APU 1020 related to a desired path and/or pose.

Each of the microcontrollers and/or processing units can be configured via firmware 1022, a real time operating system 1024, 1028, and/or a fully featured operating system 1026, 1030 such as (but not limited to) the Linux operating system. As can readily be appreciated, the decision whether to implement a complete operating system or to utilize firmware to configure a processor is largely dependent upon the requirements of a specific application.

Communication between the various processors within the UAV software architecture 1000 can be coordinated by a robot operating system 1032 that sits on top of the operating systems and/or firmware of each of the processors. The robot operating system 1032 acts as middleware that can abstract the underlying hardware from higher level processes.

In several embodiments, a number of basic services sit on top of the robot operating system. In the illustrated embodiment, the services include a navigation process 1034, and a system information monitoring process (1036) that tracks information including (but not limited to) battery levels, and/or motor speed. The services also include an obstacle avoidance process 1038 and an automatic landing and takeoff process 1040. The SLAM processes implemented by the RPU generate maps and localization information that can be accessed via the pose estimation map service 1042. In certain embodiments, raw sensor data is also exposed via a raw sensor data service 1044. When the UAV is configured as a photography robot, a photo data synchronization service 1046 can also be provided to coordinate data transmission to a cloud service (i.e. a server(s) accessible via an Internet connection).

In many embodiments, the services are abstracted by an API layer 1048. In the illustrated embodiment, a virtual photographer application 1050 executes on the APU and utilizes the API layer 1048 to obtain information necessary for identifying subjects of interest and directing the navigation service 1034 to navigate the UAV to a desired pose. As can readily be appreciated, the illustrated services and/or any additional services that may be appropriate to the requirements of specific applications can be utilized to support the execution of other applications 1052 that may be useful in configuring the UAV for a specific function.

In several embodiments, the UAV utilizes a connection (1054) with a remote computing device that may be located within the docking station and/or accessible via the Internet. The remote computing device can execute processes that enhance the capabilities of the UAV. In certain embodiments, one or more of SLAM processing, and/or motion planning can be handed off by the UAV to a remote computing device. In several embodiments, a remote computing device receives data from one or more UAVs and utilizes the data to perform machine learning processes that can enhance the algorithms utilized by the UAV such as (but not limited to): machine vision processes such as (but not limited to) object detection, person detection, and/or face detection; SLAM processes; motion planning processes; and/or image capture processes (e.g. changing heuristics with respect to imaging parameters utilized to capture images for a given set of environmental conditions).

Although specific software architectures are described above with reference to FIG. 10. Any of a variety of software processes can be utilized to implement the functionality of a UAV and configure it for specific applications as appropriate to the hardware of the UAV and the requirements of specific applications in accordance with various embodiments of the invention. In order to illustrate the manner in which an application can coordinate the operation of all of the processing components within a UAV in accordance with certain embodiments of the invention, the execution of a virtual photographer application that configures the UAV as a photography robot is discussed further below.

Autonomous Navigation Processes

A flow chart that conceptually illustrates execution of a virtual photographer application by processors on a UAV in accordance with an embodiment of the invention is illustrated in FIG. 11A. The process 1100 includes the launching of the UAV by executing an automatic takeoff process 1102. Once the UAV is in flight, the UAV can utilize a previously generated map or generate a new map to begin wandering and scanning (1104) for people. As can readily be appreciated, any of a variety of processes can be utilized to perform initial flight path planning including (but not limited to) processes that detect beacons and utilize the location of the beacon(s) in path planning. When the process of capturing images of people completes, then an automatic landing process 1106 can be utilized to navigate the UAV to and land the UAV on the docking station.

A variety of processes can be utilized to scan for people. In the illustrated embodiment, two alternative processes are illustrated. In a first process, a face detection process is performed utilizing color images captured by the main camera of the UAV and/or additional cameras in a SAM. Once a face is identified, then the location of the face can be determined using a process 1110 that locates the face within a depth map generated by the SAM. In the second process, a person detection process 1112 is utilized to identify people within a depth map and then face detection is performed using color images captured of the identified people using a face detection process 1114. While the first and second processes involve separately analyzing depth and color channels, many face detection processes in accordance with embodiments of the invention simultaneously consider both depth and color information. Furthermore, some processes use image data captured by a SAM for initial detection and refine pose based upon image data captured by the main camera once the UAV has navigated into a desired pose and/or a pose in which the subject of interest should be visible within the field of view of the main camera. As can readily be appreciated, the specific object detection process utilized to identify of a subject of interest is largely dependent upon the sensors present on the UAV and the requirements of a specific application.

When a subject of interest is detected, the UAV can perform a process to determine a desirable camera position 1116 from which to capture images of the subject. The process 1116 can utilize information concerning environmental parameters (1118) and/or additional targeting information such as (but not limited to) signal from beacons (1120) that indicate targeting prioritization. The desired pose can be utilized by a path planning process 1122 to develop a path plan to navigate the UAV through one or more desired poses to capture images. In several embodiments, an image capture process 1124 is utilized to capture images and/or audio along the entire flight path. The captured image and/or audio data can then be uploaded (1126) to a server. In several embodiments, the remote server can perform active image stabilization on video captured by the UAV. In many embodiments, multiple audio channels are provided and the server can perform active noise cancellation to eliminate noise generated by the UAV. Image capture can continue until the UAV determines that it is time to return to the docking station (1106).

In several embodiments, a curation process executes on a server that receives images from the UAV. A process for selecting photos captured by a UAV to present via a user interface that can execute on a remote server in accordance with an embodiment of the invention is illustrated in FIG. 11B. The process 1150 includes receiving (1152) photos at a server computing system, ranking (1154) the photographs utilizing a classifier and discarding (1156) a predetermined or dynamically determined number of photographs and/or photographs that meet a criterion (e.g. below a quality threshold) to obtain a final photo set. In several embodiments, the classifier utilizes machine learning to identify photographs that have compositions that are desirable. In many embodiments, the machine learning processes can involve classifiers that determine focus, presence and position of faces within the image, and/or classifiers that detect whether subjects within an image have their eyes open. As can readily be appreciated, the machine learning techniques utilized to rank photographs and the classifiers utilized to provide inputs to the ranking process are largely dependent upon the requirements of specific applications. Once a final photo set is determined, the photos can be uploaded (1158) to a third party photo sharing service and/or directly transmitted to various user computing devices. The particular mechanism utilized to share a final photo set is largely dependent upon the requirements of the users of the UAV.

Although processes utilized to configure a UAV as a photography robot are described above with reference to FIGS. 11A and 11B, as can readily be appreciated any of a variety of applications can be utilized to configure a UAV and/or remote server computer systems that support the UAV to perform different functions as appropriate to the requirements of specific applications in accordance with various embodiments of the invention. Indeed, the provision of an API to expose the services supported by the processing platforms of a UAV encourages the development of applications that can configure the UAV in new and innovative ways.

While much of the above discussion has focused on UAVs that incorporate multiple coaxial rotors, techniques including (but not limited to) the mechanical techniques for noise reduction and modifying the noise profile of a UAV and the processes for controlling and flying UAVs in accordance with various embodiments of the invention are equally applicable to UAVs that incorporate multiple radial rotors. UAVs that incorporate multiple radial ducted rotor propulsion systems in accordance with certain embodiments of the invention are discussed further below.

UAVs Incorporating Multiple Radial and/or Coaxial Rotors

As noted above, the noise profile of a UAV can be modified in any of a variety of ways including (but not limited to) the use of ducting, the use of rotors with uneven airfoil blade spacing, airfoil blade shape, and/or the use of noise dampening materials. While many of the techniques for modifying the noise profile of a UAV described above are discussed in the context of a UAV incorporating multiple coaxial rotors, it should be appreciated that the same techniques are also applicable to UAVs incorporating multiple radial rotors. A UAV incorporating multiple radial ducted rotor propulsion systems in accordance with an embodiment of the invention is illustrated in FIG. 12. An additional consideration in the construction of a UAV incorporating multiple radial ducted rotors is that slight differences in the blade passage frequencies of the rotors can create beat frequencies that are readily perceptible to humans within the vicinity of the UAV. Accordingly, UAVs in accordance with many embodiments of the invention are constructed to enable the rotors to have substantially different blade passage frequencies to avoid the generation of beats between the rotors.

Although the present invention has been described in certain specific aspects, many additional modifications and variations would be apparent to those skilled in the art. It is therefore to be understood that the present invention can be practiced otherwise than specifically described without departing form the scope and spirit of the present invention including (but not limited to) utilizing any of a variety of UAV configurations differing from those described above with respect to FIGS. 1-12. Thus, embodiments of the present invention should be considered in all respects as illustrative and not restrictive. Accordingly, the scope of the invention should not be determined by the embodiments illustrated, but by any appended claims and their equivalents.

What is claimed is:

1. A method of capturing images, comprising:
    launching an unmanned aerial vehicle (UAV) by way of a Flight Management Unit (FMU) wherein the FMU executes an automatic takeoff process;
    utilizing a map maintained by the UAV to perform in flight path planning to scan an area for people using the UAV;
    detecting the presence of at least one subject by processing image data captured by at least one camera on the UAV;
    utilizing an Application Processing Unit (APU) to determine at least one ideal position from which to capture images of detected at least one subject using the UAV;
    performing path planning by communication between the APU and a Robotics Processing Unit in order to navigate the UAV to the determined at least one ideal position; and
    capturing images of the detected at least one subject using at least one camera on the UAV when the UAV is positioned in one of the determined at least one ideal positions.

2. The method of claim 1, further comprising capturing audio data using a microphone on the UAV.

3. An unmanned aerial vehicle, comprising:
    at least one rotor system having a plurality of rotor blades connected to one central rotation point wherein the plurality of rotor blades are configured to incorporate uneven angular blade spacing about the one central rotation point and wherein the at least one rotor system is configured to be mounted within a ducted propulsion system;
    a flight management unit (FMU) configured to handle all of the computation associated with controlling rotors within the ducted propulsion system;
    a robotics processing unit (RPU) configured to perform autonomous navigation;
    an application processing unit (APU) configured to perform processing associated with high level behavior.

4. The unmanned aerial vehicle of claim 3, wherein the APU is configured to execute processes including: identification of subjects of interest; position selection; and image acquisition.

5. The unmanned aerial vehicle of claim 3, wherein each of the FMU, RPU, and APU includes a microprocessor.

6. The unmanned aerial vehicle of claim 3, wherein the APU is configured to execute the process of autonomously navigating to a docking station to perform data transfer.

7. The UAV of claim 3 wherein the at least one rotor system is an underactuated rotor system comprising rigid central hub hingedly connected to the plurality of rotor blades such that the at least one rotor system may achieve uneven blade spacing of the plurality of rotor blades in a dynamic format.

8. The UAV of claim 3 wherein the FMU, the RPU, and the APU, are configured to communicate with remote servers via a wireless network connection.

9. The method of claim 1 wherein the at least one camera further comprises at least one optical system selected from the group consisting of:
    Fisheye lens and catadiopitc lens.

10. The method of claim 1 wherein the UAV is configured to simultaneously utilize a map maintained by the UAV to perform in flight path planning and detect the presence of at least one subject by processing image data captured by at least one camera on the UAV.

11. The UAV of claim 3 wherein the UAV is configured to simultaneously utilize a map maintained by the UAV to perform in flight path planning and detect the presence of at least one subject by processing image data captured by at least one camera on the UAV.

12. The method of claim 1 further comprising;
    receiving new information regarding the context of an external environment and utilizing the APU to determine at least one new ideal position from which to capture images of detected at least one subject using the UAV.

13. The UAV of claim 3 further comprising a plurality of rotor systems coaxially mounted within the ducted propulsion system.

14. The UAV of claim 3 wherein the plurality of rotor blades are configured to have a shape selected from a group consisting of:
    a serrated trailing edge, a serrated leading edge, a wide chord, a scimitar, and a spanwise reverse sweep.

15. The UAV of claim 3 further comprising a plurality of sensors cooperatively connected to the body of the ducted propulsion system and in communication with the FMU, the RPU, and the APU of the UAV.

16. The UAV of claim 15 wherein the plurality of sensors are sonar sensors.

* * * * *